US011784697B1

(12) United States Patent
Zhu et al.

(10) Patent No.: US 11,784,697 B1
(45) Date of Patent: Oct. 10, 2023

(54) TECHNIQUES FOR THROUGHPUT-CONSTRAINED BEAM SELECTION WITH SELF-CORRECTION AND VIRTUAL SERVING BEAM TRACKING

(71) Applicant: QUALCOMM Incorporated, San Diego, CA (US)

(72) Inventors: Jun Zhu, San Diego, CA (US); Mihir Vijay Laghate, San Diego, CA (US); Raghu Narayan Challa, San Diego, CA (US); Michael Lee McCloud, San Diego, CA (US); Brian Clarke Banister, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/814,686

(22) Filed: Jul. 25, 2022

(51) Int. Cl.
*H04B 7/06* (2006.01)
*H04W 72/044* (2023.01)
(Continued)

(52) U.S. Cl.
CPC ......... *H04B 7/0639* (2013.01); *H04B 7/0608* (2013.01); *H04B 7/0632* (2013.01);
(Continued)

(58) Field of Classification Search
CPC ..... H04W 84/06; H04W 24/02; H04W 24/10; H04W 16/18; H04W 24/04;
(Continued)

(56) References Cited

U.S. PATENT DOCUMENTS 10,855,342 B2 * 12/2020 Guo .................. H04B 7/088
11,159,213 B2  10/2021 Zhang et al.
(Continued)

FOREIGN PATENT DOCUMENTS

WO   WO-2021098965 A1   5/2021

OTHER PUBLICATIONS

Qualcomm Incorporated: "UE Adaptation to the Traffic and UE Power Consumption Characteristics", 3GPP TSG-RAN WG1 Meeting #94bis, R1-1811282, UE Adaptation for Power Saving, 3rd Generation Partnership Project, Mobile Competence Centre, 650, Route Des Lucioles, F-06921 Sophia-Antipolis Cedex, France, vol. RAN WG1, No. Chengdu, China, Oct. 8, 2018-Oct. 12, 2018, Sep. 29, 2018, pp. 1-17, XP051518685, Section 2.3, Adaptation in Number of Antennas.
(Continued)

*Primary Examiner* — Eva Y Puente
(74) *Attorney, Agent, or Firm* — Dalei Dong; Harrity & Harrity, LLP

(57) ABSTRACT

Various aspects of the present disclosure generally relate to wireless communication. In some aspects, a user equipment (UE) may configure a first set of throughput targets and a second set of throughput targets for an application layer. The UE may set a target throughput rate associated with the application to a required throughput target included in the first set of throughput targets. The UE may monitor a real-time throughput rate associated with the application layer. The UE may set the target throughput rate to a value in the second set of throughput targets based at least in part on a difference between the real-time throughput rate and the required throughput target satisfying a threshold. The UE may select, from a set of candidate beams, a serving beam associated with an estimated application layer throughput
(Continued)

that satisfies the target throughput rate. Numerous other aspects are described.

30 Claims, 10 Drawing Sheets

(51) Int. Cl.
  *H04W 72/23* (2023.01)
  *H04W 72/54* (2023.01)
(52) U.S. Cl.
  CPC ......... *H04W 72/046* (2013.01); *H04W 72/23* (2023.01); *H04W 72/54* (2023.01)
(58) Field of Classification Search
  CPC .... H04W 52/244; H04W 16/28; H04B 17/11; H04B 17/21; H04B 7/18515; H04B 7/0617; H04B 17/12; H04B 7/18519; H04B 17/14; H04L 25/0224; H04L 25/0204; H04L 27/2602; H04L 27/2646; H04L 5/0035; H04L 1/0052
  USPC .......................................................... 375/262
  See application file for complete search history.

(56) References Cited

U.S. PATENT DOCUMENTS

| 11,646,769 | B1* | 5/2023 | Zhu | H04B 7/0426 |
| | | | | 375/267 |
| 2014/0148107 | A1* | 5/2014 | Maltsev | H04B 1/02 |
| | | | | 455/91 |
| 2022/0038934 | A1* | 2/2022 | Kumar | H04W 24/10 |

OTHER PUBLICATIONS

VIVO: "Discussion on Multi-Beam Enhancement", 3GPP TSG RAN WG1 #102-e, R1-2005363, 3rd Generation Partnership Project (3GPP), Mobile Competence Centre, 650, Route Des Lucioles, F-06921 Sophia-Antipolis Cedex, France, vol. RAN WG1, No. e-Meeting, Aug. 17, 2020-Aug. 28, 2020, Aug. 8, 2020, XP051917388, 21 Pages, paragraph [0005], Section 6, the whole document.

* cited by examiner

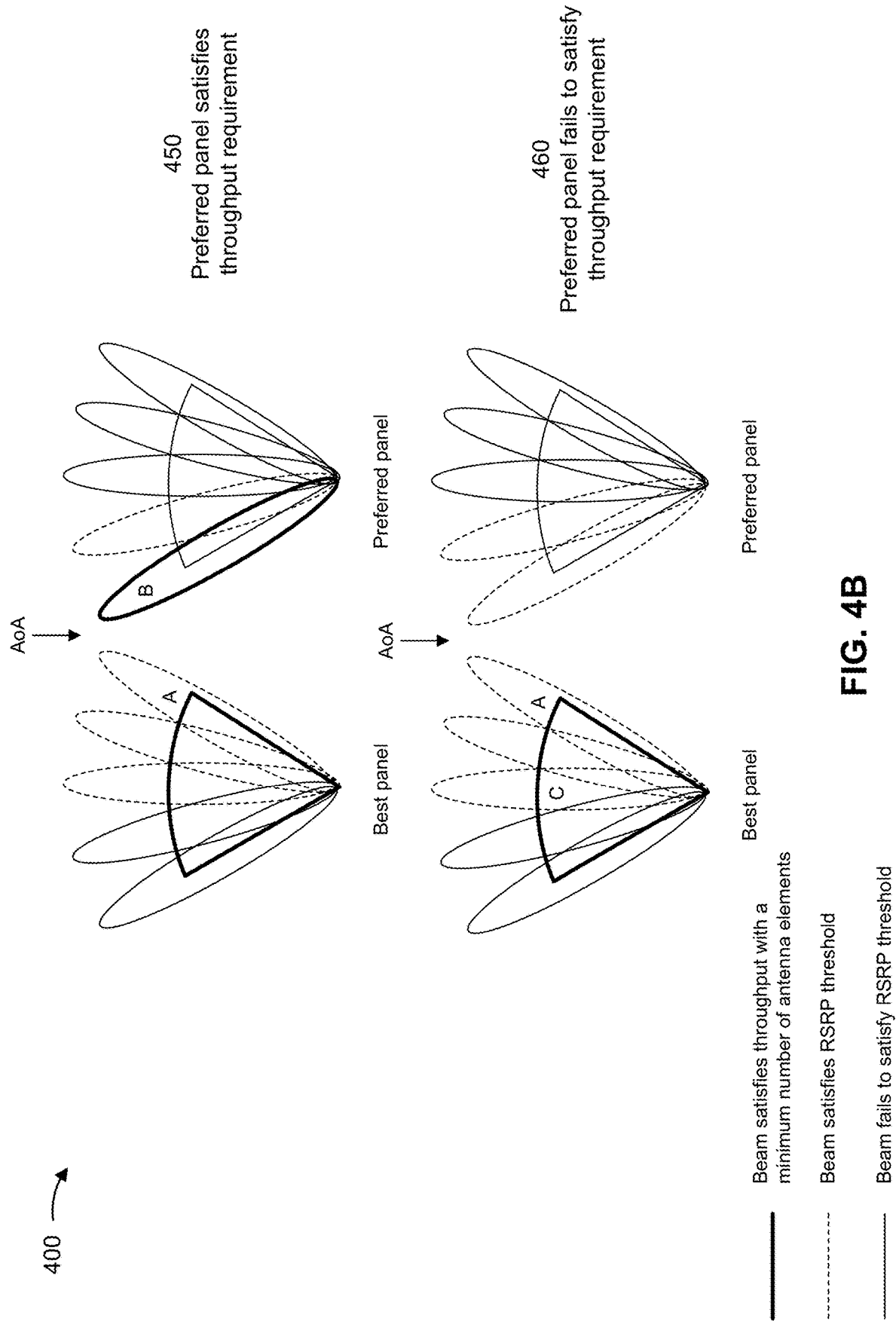

TECHNIQUES FOR THROUGHPUT-CONSTRAINED BEAM SELECTION WITH SELF-CORRECTION AND VIRTUAL SERVING BEAM TRACKING

FIELD OF THE DISCLOSURE

Aspects of the present disclosure generally relate to wireless communication and to techniques and apparatuses associated with throughput-constrained beam selection with self-correction and virtual serving beam tracking.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth, transmit power, etc.). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

These multiple access technologies have been adopted in various telecommunication standards to provide a common protocol that enables different UEs to communicate on a municipal, national, regional, or global level. New Radio (NR), which also may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency-division multiplexing (OFDM) with a cyclic prefix (CP) (CP-OFDM) on the downlink, using CP-OFDM or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation.

SUMMARY

Some aspects described herein relate to a method of wireless communication performed by a user equipment (UE). The method may include configuring a first set of throughput targets and a second set of throughput targets for an application layer, wherein the first set of throughput targets include a required throughput target associated with the application layer and the second set of throughput targets include a set of intermediate throughput targets that are configured for the application layer in addition to the required throughput target. The method may include setting a target throughput rate associated with the application to the required throughput target included in the first set of throughput targets. The method may include monitoring a real-time throughput rate associated with the application layer. The method may include setting the target throughput rate to a value in the second set of throughput targets based at least in part on a difference between the real-time throughput rate and the required throughput target satisfying a threshold. The method may include selecting, from a set of candidate beams, a serving beam associated with an estimated application layer throughput that satisfies the target throughput rate.

Some aspects described herein relate to a method of wireless communication performed by a UE. The method may include identifying a set of virtual serving UE beams that includes, for each beam associated with a network node at each of a plurality of beam levels on each of a plurality of antenna panels, a UE beam that has a best current value for a beam metric. The method may include monitoring, for each beam associated with the network node at each of the plurality of beam levels on each of the plurality of antenna panels, the respective beam metric associated with each UE beam in the set of virtual serving UE beams. The method may include estimating, for each UE beam in the set of virtual serving UE beams for at least one beam associated with the network node, an application layer throughput. The method may include selecting, from the set of virtual serving UE beams for at least one beam associated with the network node, a serving beam based at least in part on the estimated application layer throughput for each UE beam in the set of virtual serving UE beams.

Some aspects described herein relate to a UE for wireless communication. The UE may include a memory and one or more processors coupled to the memory. The one or more processors may be configured to configure a first set of throughput targets and a second set of throughput targets for an application layer, wherein the first set of throughput targets include a required throughput target associated with the application layer and the second set of throughput targets include a set of intermediate throughput targets that are configured for the application layer in addition to the required throughput target. The one or more processors may be configured to set a target throughput rate associated with the application to the required throughput target included in the first set of throughput targets. The one or more processors may be configured to monitor a real-time throughput rate associated with the application layer. The one or more processors may be configured to set the target throughput rate to a value in the second set of throughput targets based at least in part on a difference between the real-time throughput rate and the required throughput target satisfying a threshold. The one or more processors may be configured to select, from a set of candidate beams, a serving beam associated with an estimated application layer throughput that satisfies the target throughput rate.

Some aspects described herein relate to a UE for wireless communication. The UE may include a memory and one or more processors coupled to the memory. The one or more processors may be configured to identify a set of virtual serving UE beams that includes, for each beam associated with a network node at each of a plurality of beam levels on each of a plurality of antenna panels, a UE beam that has a best current value for a beam metric. The one or more processors may be configured to monitor, for each beam associated with the network node at each of the plurality of beam levels on each of the plurality of antenna panels, the respective beam metric associated with each UE beam in the set of virtual serving UE beams. The one or more processors may be configured to estimate, for each UE beam in the set of virtual serving UE beams for at least one beam associated with the network node, an application layer throughput. The one or more processors may be configured to select, from the set of virtual serving UE beams for at least one beam associated with the network node, a serving beam based at least in part on the estimated application layer throughput for each UE beam in the set of virtual serving UE beams.

Some aspects described herein relate to a non-transitory computer-readable medium that stores a set of instructions for wireless communication by a UE. The set of instructions, when executed by one or more processors of the UE, may cause the UE to configure a first set of throughput targets and a second set of throughput targets for an application layer, wherein the first set of throughput targets include a required throughput target associated with the application layer and the second set of throughput targets include a set of intermediate throughput targets that are configured for the application layer in addition to the required throughput target. The set of instructions, when executed by one or more processors of the UE, may cause the UE to set a target throughput rate associated with the application to the required throughput target included in the first set of throughput targets. The set of instructions, when executed by one or more processors of the UE, may cause the UE to monitor a real-time throughput rate associated with the application layer. The set of instructions, when executed by one or more processors of the UE, may cause the UE to set the target throughput rate to a value in the second set of throughput targets based at least in part on a difference between the real-time throughput rate and the required throughput target satisfying a threshold. The set of instructions, when executed by one or more processors of the UE, may cause the UE to select, from a set of candidate beams, a serving beam associated with an estimated application layer throughput that satisfies the target throughput rate.

Some aspects described herein relate to a non-transitory computer-readable medium that stores a set of instructions for wireless communication by a one or more instructions that, when executed by one or more processors of an UE. The set of instructions, when executed by one or more processors of the one or more instructions that, when executed by one or more processors of an UE, may cause the one or more instructions that, when executed by one or more processors of an UE to identify a set of virtual serving UE beams that includes, for each beam associated with a network node at each of a plurality of beam levels on each of a plurality of antenna panels, a UE beam that has a best current value for a beam metric. The set of instructions, when executed by one or more processors of the one or more instructions that, when executed by one or more processors of an UE, may cause the one or more instructions that, when executed by one or more processors of an UE to monitor, for each beam associated with the network node at each of the plurality of beam levels on each of the plurality of antenna panels, the respective beam metric associated with each UE beam in the set of virtual serving UE beams. The set of instructions, when executed by one or more processors of the one or more instructions that, when executed by one or more processors of an UE, may cause the one or more instructions that, when executed by one or more processors of an UE to estimate, for each UE beam in the set of virtual serving UE beams for at least one beam associated with the network node, an application layer throughput. The set of instructions, when executed by one or more processors of the one or more instructions that, when executed by one or more processors of an UE, may cause the one or more instructions that, when executed by one or more processors of an UE to select, from the set of virtual serving UE beams for at least one beam associated with the network node, a serving beam based at least in part on the estimated application layer throughput for each UE beam in the set of virtual serving UE beams.

Some aspects described herein relate to an apparatus for wireless communication. The apparatus may include means for configuring a first set of throughput targets and a second set of throughput targets for an application layer, wherein the first set of throughput targets include a required throughput target associated with the application layer and the second set of throughput targets include a set of intermediate throughput targets that are configured for the application layer in addition to the required throughput target. The apparatus may include means for setting a target throughput rate associated with the application to the required throughput target included in the first set of throughput targets. The apparatus may include means for monitoring a real-time throughput rate associated with the application layer. The apparatus may include means for setting the target throughput rate to a value in the second set of throughput targets based at least in part on a difference between the real-time throughput rate and the required throughput target satisfying a threshold. The apparatus may include means for selecting, from a set of candidate beams, a serving beam associated with an estimated application layer throughput that satisfies the target throughput rate.

Some aspects described herein relate to an apparatus for wireless communication. The apparatus may include means for identifying a set of virtual serving UE beams that includes, for each beam associated with a network node at each of a plurality of beam levels on each of a plurality of antenna panels, a UE beam that has a best current value for a beam metric. The apparatus may include means for monitoring, for each beam associated with the network node at each of the plurality of beam levels on each of the plurality of antenna panels, the respective beam metric associated with each UE beam in the set of virtual serving UE beams. The apparatus may include means for estimating, for each UE beam in the set of virtual serving UE beams for at least one beam associated with the network node, an application layer throughput. The apparatus may include means for selecting, from the set of virtual serving UE beams for at least one beam associated with the network node, a serving beam based at least in part on the estimated application layer throughput for each UE beam in the set of virtual serving UE beams.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 4A-4B are diagrams illustrating an example associated with throughput-constrained beam selection, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
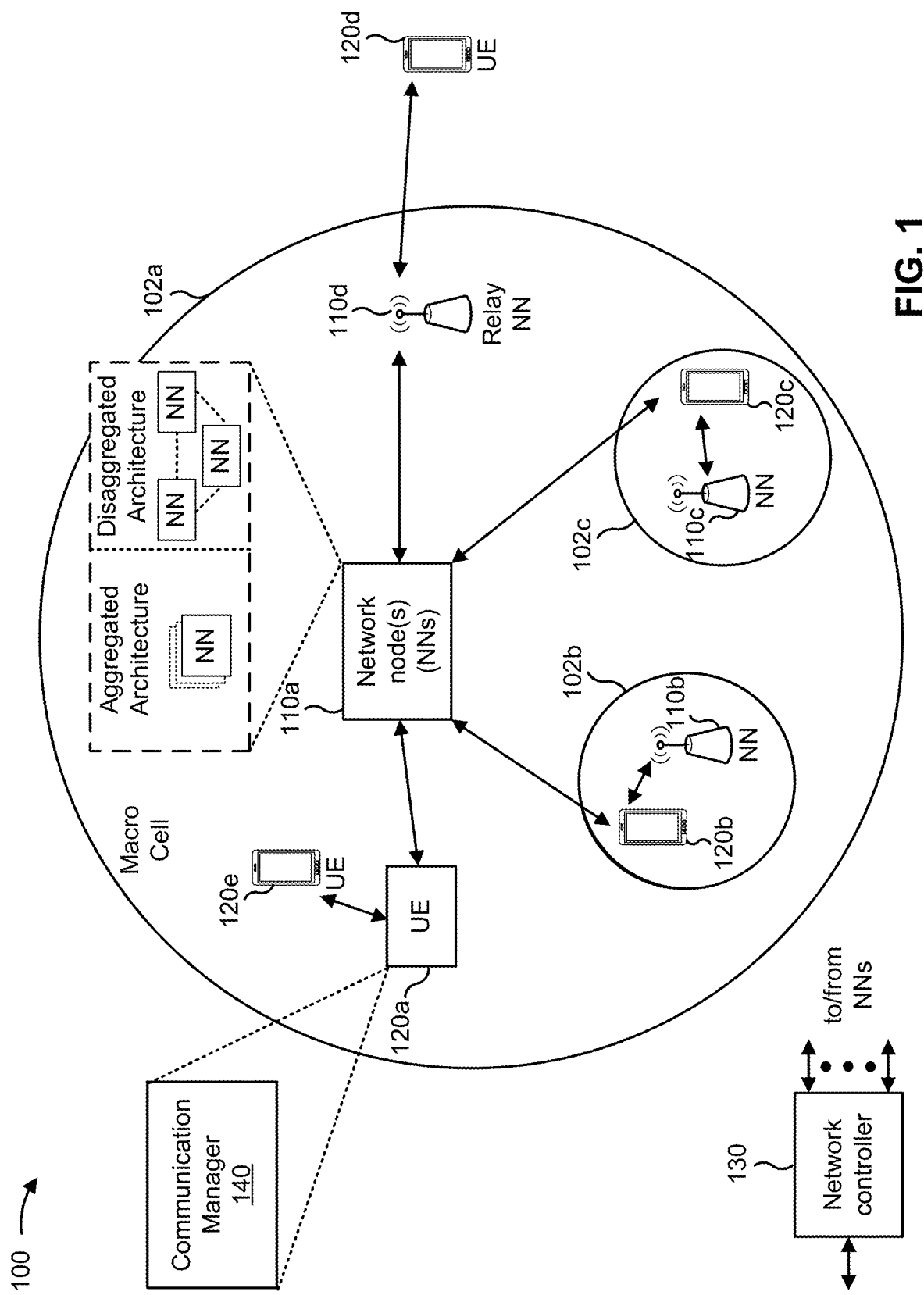
FIG. 1 is a diagram illustrating an example of a wireless network, in accordance with the present disclosure.

FIG. 1 is a diagram illustrating an example of a wireless network 100. The wireless network 100 may be or may include elements of a 5G (for example, NR) network or a 4G (for example, Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), or other entities. A network node 110 is an example of a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single RAN node (for example, within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (for example, in 4G), a gNB (for example, in 5G), an access point, or a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 or a network node subsystem serving this coverage area, depending on the context in which the term is used. A network node 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (for example, a home) and may allow restricted access by UEs 120 having association with the femto cell (for example, UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (for example, three) cells. In some examples, a cell may not necessarily be stationary, and the geographic area of the cell may move according to the location of a network node 110 that is mobile (for example, a mobile network node).

In some aspects, the term "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the term "base station" or "network node" may refer to one device configured to perform one or more functions, such as those described herein in connection with the network node 110. In some aspects, the term "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the term "base station" or "network node" may refer to any one or more of those different devices. In some aspects, the term "base station" or "network node" may refer to one or more virtual base stations or one or more virtual base station functions. For example, in some aspects, two or more base station functions may be instantiated on a single device. In some aspects, the term "base station" or "network node" may refer to one of the base station functions and not another. In this way, a single device may include more than one base station.

The wireless network 100 may include one or more relay stations. A relay station is a network node that can receive a transmission of data from an upstream node (for example, a network node 110 or a UE 120) and send a transmission of the data to a downstream node (for example, a UE 120 or a network node 110). A relay station may be a UE 120 that can relay transmissions for other UEs 120. In the example shown in FIG. 1, the network node 110d (for example, a relay network node) may communicate with the network node 110a (for example, a macro network node) and the UE 120d in order to facilitate communication between the network node 110a and the UE 120d. A network node 110 that relays communications may be referred to as a relay station, a relay base station, a relay network node, a relay node, or a relay, among other examples.

The wireless network 100 may be a heterogeneous network that includes network nodes 110 of different types, such as macro network nodes, pico network nodes, femto network nodes, or relay network nodes. These different types of network nodes 110 may have different transmit power levels, different coverage areas, or different impacts on interference in the wireless network 100. For example, macro network nodes may have a high transmit power level (for example, 5 to 40 watts) whereas pico network nodes, femto network nodes, and relay network nodes may have lower transmit power levels (for example, 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, or a subscriber unit. A UE 120 may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, smart jewelry (for example, a smart ring or a smart bracelet)), an entertainment device (for example, a music device, a video device, or a satellite radio), a vehicular component or sensor, a smart meter/sensor, industrial manufacturing equipment, a global positioning system device, a UE function of a network node, or any other suitable device that is configured to communicate via a wireless or wired medium.

Some UEs 120 may be considered machine-type communication (MTC) or evolved or enhanced machine-type communication (eMTC) UEs. An MTC UE or an eMTC UE may include, for example, a robot, a drone, a remote device, a sensor, a meter, a monitor, or a location tag, that may communicate with a network node, another device (for example, a remote device), or some other entity. Some UEs 120 may be considered Internet-of-Things (IoT) devices, or may be implemented as NB-IoT (narrowband IoT) devices. Some UEs 120 may be considered a Customer Premises Equipment. A UE 120 may be included inside a housing that houses components of the UE 120, such as processor components or memory components. In some examples, the processor components and the memory components may be coupled together. For example, the processor components (for example, one or more processors) and the memory components (for example, a memory) may be operatively coupled, communicatively coupled, electronically coupled, or electrically coupled.

In general, any number of wireless networks 100 may be deployed in a given geographic area. Each wireless network 100 may support a particular RAT and may operate on one or more frequencies. A RAT may be referred to as a radio technology or an air interface. A frequency may be referred to as a carrier or a frequency channel. Each frequency may support a single RAT in a given geographic area in order to avoid interference between wireless networks of different RATs. In some cases, NR or 5G RAT networks may be deployed.

In some examples, two or more UEs 120 (for example, shown as UE 120a and UE 120e) may communicate directly using one or more sidelink channels (for example, without using a network node 110 as an intermediary to communicate with one another). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, or a vehicle-to-pedestrian (V2P) protocol), or a mesh network. In such examples, a UE 120 may perform scheduling operations, resource selection operations, or other operations described elsewhere herein as being performed by the network node 110.

Devices of the wireless network 100 may communicate using the electromagnetic spectrum, which may be subdivided by frequency or wavelength into various classes, bands, or channels. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics or FR2 characteristics, and thus may effectively extend features of FR1 or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With these examples in mind, unless specifically stated otherwise, the term "sub-6 GHz," if used herein, may broadly represent frequencies that may be less than 6 GHz, may be within FR1, or may include mid-band frequencies. Further, unless specifically stated otherwise, the term "millimeter wave," if used herein, may broadly represent frequencies that may include mid-band frequencies, may be within FR2, FR4, FR4-a or FR4-1, or FR5, or may be within the EHF band. It is contemplated that the frequencies included in these operating bands (for example, FR1, FR2, FR3, FR4, FR4-a, FR4-1, or FR5) may be modified, and techniques described herein are applicable to those modified frequency ranges.

In some aspects, the UE 120 may include a communication manager 140. As described in more detail elsewhere herein, the communication manager 140 may configure a first set of throughput targets and a second set of throughput targets for an application layer, wherein the first set of throughput targets include a required throughput target associated with the application layer and the second set of throughput targets include a set of intermediate throughput targets that are configured for the application layer in addition to the required throughput target; set a target throughput rate associated with the application to the required throughput target included in the first set of throughput targets; monitor a real-time throughput rate associated with the application layer; set the target throughput rate to a value in the second set of throughput targets based at least in part on a difference between the real-time throughput rate and the required throughput target satisfying a threshold; and select, from a set of candidate beams, a serving beam associated with an estimated application layer throughput that satisfies the target throughput rate.

Additionally, or alternatively, the communication manager 140 may identify a set of virtual serving UE beams that includes, for each beam associated with a network node at each of a plurality of beam levels on each of a plurality of antenna panels, a UE beam that has a best current value for a beam metric; monitor, for each beam associated with the network node at each of the plurality of beam levels on each of the plurality of antenna panels, the respective beam metric associated with each UE beam in the set of virtual serving UE beams; estimate, for each UE beam in the set of virtual serving UE beams for at least one beam associated with the network node, an application layer throughput; and select, from the set of virtual serving UE beams for at least one beam associated with the network node, a serving beam based at least in part on the estimated application layer throughput for each UE beam in the set of virtual serving UE beams.

Additionally, or alternatively, the communication manager 140 may perform one or more other operations described herein.

As indicated above, FIG. 1 is provided as an example. Other examples may differ from what is described with regard to FIG. 1.

Figure 2:
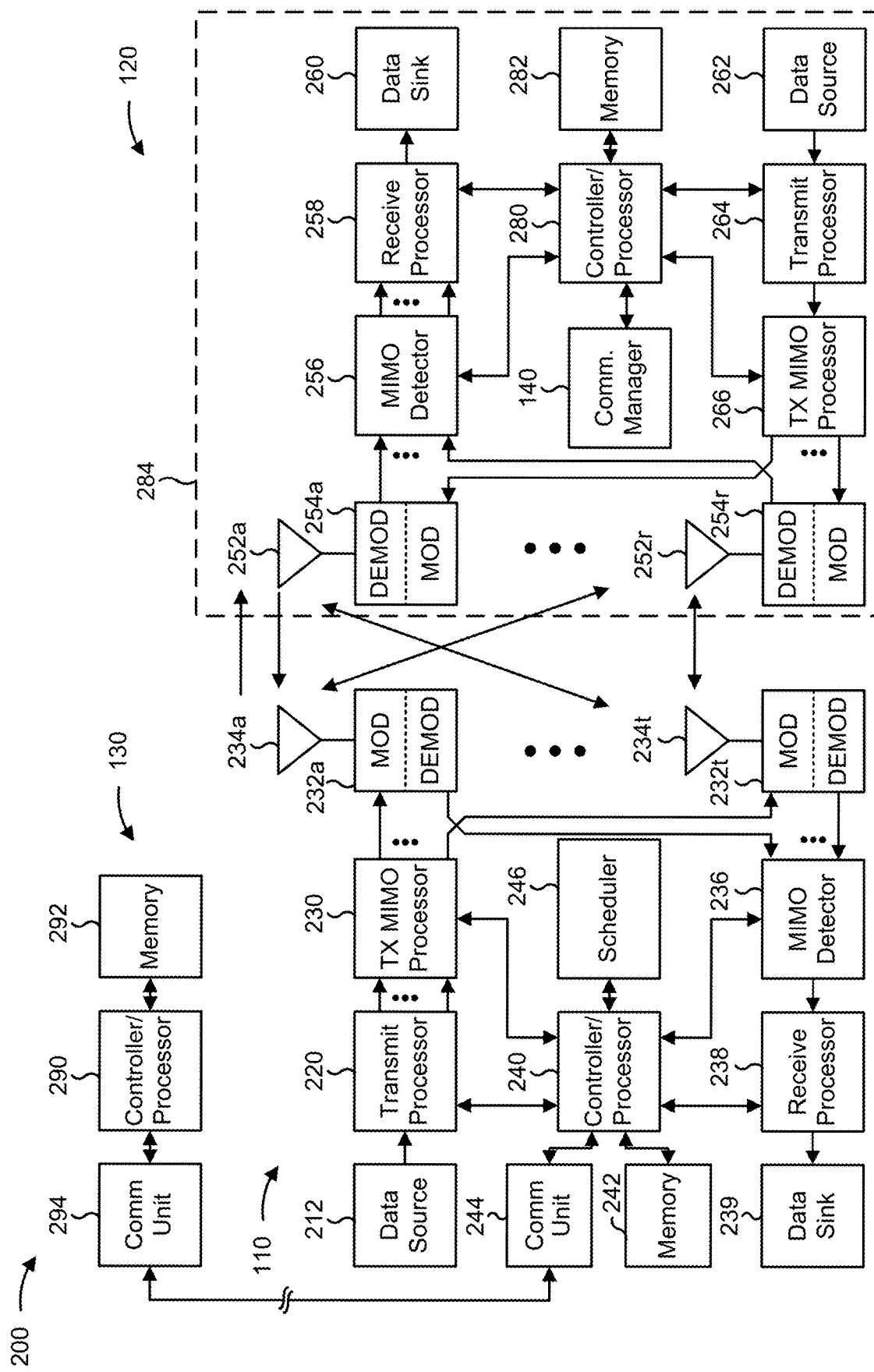
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 254. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 using one or more channel quality indicators (CQIs) received from that UE 120. The network node 110 may process (for example, encode and modulate) the data for the UE 120 using the MCS(s) selected for the UE 120 and may provide data symbols for the UE 120. The transmit processor 220 may process system information (for example, for semi-static resource partitioning information (SRPI)) and control information (for example, CQI requests, grants, or upper layer signaling) and provide overhead symbols and control symbols. The transmit processor 220 may generate reference symbols for reference signals (for example, a cell-specific reference signal (CRS) or a demodulation reference signal (DMRS)) and synchronization signals (for example, a primary synchronization signal (PSS) or a secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide a set of output symbol streams (for example, T output symbol streams) to a corresponding set of modems 232 (for example, T modems), shown as modems 232a through 232t. For example, each output symbol stream may be provided to a modulator component (shown as MOD) of a modem 232. Each modem 232 may use a respective modulator component to process a respective output symbol stream (for example, for OFDM) to obtain an output sample stream. Each modem 232 may further use a respective modulator component to process (for example, convert to analog, amplify, filter, or upconvert) the output sample stream to obtain a downlink signal. The modems 232a through 232t may transmit a set of downlink signals (for example, T downlink signals) via a corresponding set of antennas 234 (for example, T antennas), shown as antennas 234a through 234t.

At the UE 120, a set of antennas 252 (shown as antennas 252a through 252r) may receive the downlink signals from the network node 110 or other network nodes 110 and may provide a set of received signals (for example, R received signals) to a set of modems 254 (for example, R modems), shown as modems 254a through 254r. For example, each received signal may be provided to a demodulator component (shown as DEMOD) of a modem 254. Each modem 254 may use a respective demodulator component to condition (for example, filter, amplify, downconvert, or digitize) a received signal to obtain input samples. Each modem 254 may use a demodulator component to further process the input samples (for example, for OFDM) to obtain received symbols. A MIMO detector 256 may obtain received symbols from the modems 254, may perform MIMO detection on the received symbols if applicable, and may provide detected symbols. A receive processor 258 may process (for example, demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (for example, antennas 234a through 234t or antennas 252a through 252r) may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled to one or more transmission or reception components, such as one or more components of FIG. 2.

On the uplink, at the UE 120, a transmit processor 264 may receive and process data from a data source 262 and control information (for example, for reports that include RSRP, RSSI, RSRQ, or CQI) from the controller/processor 280. The transmit processor 264 may generate reference symbols for one or more reference signals. The symbols from the transmit processor 264 may be precoded by a TX MIMO processor 266 if applicable, further processed by the modems 254 (for example, for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, or the TX MIMO processor 266. The transceiver may be used by a processor (for example, the controller/processor 280) and the memory 282 to perform aspects of any of the processes described herein (e.g., with reference to FIGS. 4A-4B, FIG. 5, FIG. 6, FIG. 7, FIG. 8, and/or FIG. 9).

At the network node 110, the uplink signals from UE 120 or other UEs may be received by the antennas 234, processed by the modem 232 (for example, a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, or the TX MIMO processor 230. The transceiver may be used by a processor (for example, the controller/processor 240) and the memory 242 to perform aspects of any of the processes described herein (e.g., with reference to FIGS. 4A-4B, FIG. 5, FIG. 6, FIG. 7, FIG. 8, and/or FIG. 9).

In some aspects, the controller/processor 280 may be a component of a processing system. A processing system may generally be a system or a series of machines or components that receives inputs and processes the inputs to produce a set of outputs (which may be passed to other systems or components of, for example, the UE 120). For example, a processing system of the UE 120 may be a system that includes the various other components or subcomponents of the UE 120.

The processing system of the UE 120 may interface with one or more other components of the UE 120, may process information received from one or more other components (such as inputs or signals), or may output information to one or more other components. For example, a chip or modem of the UE 120 may include a processing system, a first interface to receive or obtain information, and a second interface to output, transmit, or provide information. In some examples, the first interface may be an interface between the processing system of the chip or modem and a receiver, such that the UE 120 may receive information or signal inputs, and the information may be passed to the processing system. In some examples, the second interface may be an interface between the processing system of the chip or modem and a transmitter, such that the UE 120 may transmit information output from the chip or modem. A person having ordinary skill in the art will readily recognize that the second interface also may obtain or receive information or signal inputs, and the first interface also may output, transmit, or provide information.

In some aspects, the controller/processor 240 may be a component of a processing system. A processing system may generally be a system or a series of machines or components that receives inputs and processes the inputs to produce a set of outputs (which may be passed to other systems or components of, for example, the network node 110). For example, a processing system of the network node 110 may be a system that includes the various other components or subcomponents of the network node 110.

The processing system of the network node 110 may interface with one or more other components of the network node 110, may process information received from one or more other components (such as inputs or signals), or may output information to one or more other components. For example, a chip or modem of the network node 110 may include a processing system, a first interface to receive or obtain information, and a second interface to output, transmit, or provide information. In some examples, the first interface may be an interface between the processing system of the chip or modem and a receiver, such that the network node 110 may receive information or signal inputs, and the information may be passed to the processing system. In some examples, the second interface may be an interface between the processing system of the chip or modem and a transmitter, such that the network node 110 may transmit information output from the chip or modem. A person having ordinary skill in the art will readily recognize that the second interface also may obtain or receive information or signal inputs, and the first interface also may output, transmit, or provide information.

The controller/processor 240 of the network node 110, the controller/processor 280 of the UE 120, or any other component(s) of FIG. 2 may perform one or more techniques associated with throughput-constrained beam selection with self-correction and virtual serving beam tracking, as described in more detail elsewhere herein. For example, the controller/processor 240 of the network node 110, the controller/processor 280 of the UE 120, or any other component(s) (or combinations of components) of FIG. 2 may perform or direct operations of, for example, process 700 of FIG. 7, process 800 of FIG. 8, and/or other processes as described herein. The memory 242 and the memory 282 may store data and program codes for the network node 110 and the UE 120, respectively. In some examples, the memory 242 and the memory 282 may include a non-transitory computer-readable medium storing one or more instructions (for example, code or program code) for wireless communication. For example, the one or more instructions, when executed (for example, directly, or after compiling, converting, or interpreting) by one or more processors of the network node 110 or the UE 120, may cause the one or more processors, the UE 120, or the network node 110 to perform or direct operations of, for example, process 700 of FIG. 7, process 800 of FIG. 8, and/or other processes as described herein. In some examples, executing instructions may include running the instructions, converting the instructions, compiling the instructions, and/or interpreting the instructions, among other examples.

In some aspects, the UE 120 includes means for configuring a first set of throughput targets and a second set of throughput targets for an application layer, wherein the first set of throughput targets include a required throughput target associated with the application layer and the second set of throughput targets include a set of intermediate throughput targets that are configured for the application layer in addition to the required throughput target; means for setting a target throughput rate associated with the application to the required throughput target included in the first set of throughput targets; means for monitoring a real-time throughput rate associated with the application layer; means for setting the target throughput rate to a value in the second set of throughput targets based at least in part on a difference between the real-time throughput rate and the required throughput target satisfying a threshold; and/or means for selecting, from a set of candidate beams, a serving beam associated with an estimated application layer throughput that satisfies the target throughput rate.

Additionally, or alternatively, the UE 120 includes means for identifying a set of virtual serving UE beams that includes, for each beam associated with a network node at each of a plurality of beam levels on each of a plurality of antenna panels, a UE beam that has a best current value for a beam metric; means for monitoring, for each beam associated with the network node at each of the plurality of beam levels on each of the plurality of antenna panels, the respective beam metric associated with each UE beam in the set of virtual serving UE beams; means for estimating, for each UE beam in the set of virtual serving UE beams for at least one beam associated with the network node, an application layer throughput; and/or means for selecting, from the set of virtual serving UE beams for at least one beam associated with the network node, a serving beam based at least in part on the estimated application layer throughput for each UE beam in the set of virtual serving UE beams.

The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (for example, within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
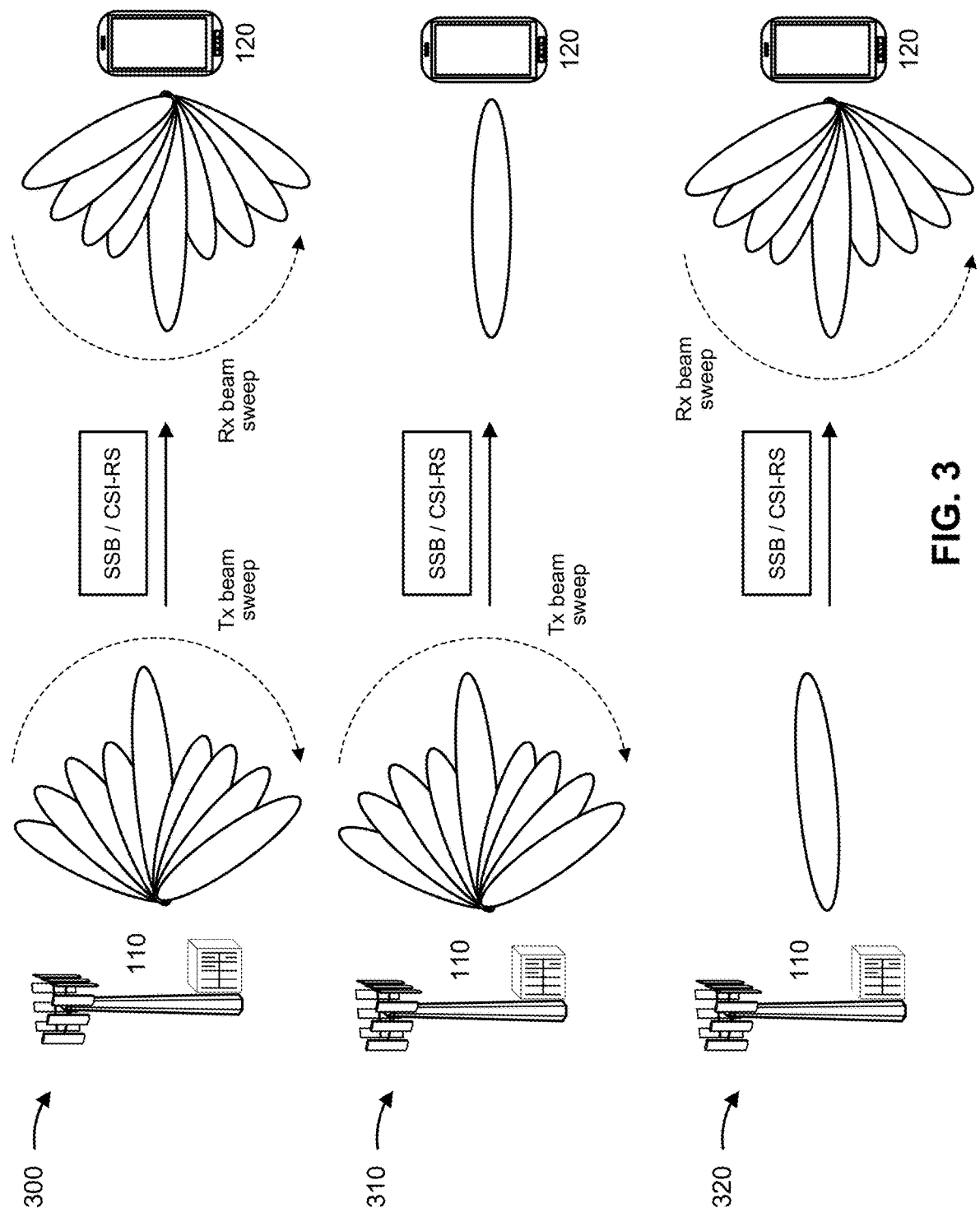
FIG. 3 is a diagram illustrating examples of beam management procedures, in accordance with the present disclosure.

FIG. 3 is a diagram illustrating examples 300, 310, and 320 of beam management procedures based on downlink reference signal transmissions, in accordance with the present disclosure. As shown in FIG. 3, examples 300, 310, and 320 include a UE 120 in communication with a network node 110 in a wireless network (e.g., wireless network 100). However, the devices shown in FIG. 3 are provided as examples, and the wireless network may support communication and beam management between other devices (e.g., between a UE 120 and a TRP, DU, or RU, between a mobile termination node and a control node, between an IAB child node and an IAB parent node, and/or between a scheduled node and a scheduling node). In some aspects, the UE 120 and the network node 110 may be in a connected state (e.g., a radio resource control (RRC) connected state) when performing the beam management procedure(s).

As shown in FIG. 3, example 300 may include the network node 110 and the UE 120 communicating to perform beam management using synchronization signal block (SSB) transmissions or channel state information reference signal (CSI-RS) transmissions. Example 300 depicts a first beam management procedure (e.g., P1 beam management). The first beam management procedure may be referred to as a beam selection procedure, an initial beam acquisition procedure, a beam sweeping procedure, a cell search procedure, and/or a beam search procedure. As shown in FIG. 3 and example 300, SSBs and/or CSI-RSs may be configured to be transmitted from the network node 110 to the UE 120 during the first beam management procedure. For example, an SSB transmitted by the network node 110 is a single rank (rank-1) periodic reference signal that is always transmitted by the network node 110 to enable initial network acquisition and synchronization in addition to beam selection and beam management. For example, an identifier associated with an SSB may have a one-to-one mapping to a transmit beam used by the network node 110, and the one-to-one mapping may be invariant (e.g., static) over time. Additionally, or alternatively, in cases where CSI-RS transmissions are used for the first beam management procedure, the CSI-RSs used for beam selection or beam management may be configured to be periodic (e.g., using RRC signaling), semi-persistent (e.g., using media access control (MAC) control element (MAC-CE) signaling), and/or aperiodic (e.g., using downlink control information (DCI)).

The first beam management procedure may include the network node 110 performing a beam sweep over multiple transmit (Tx) beams. The network node 110 may transmit an SSB or a CSI-RS using each transmit beam for beam management. To enable the UE 120 to perform receive (Rx) beam sweeping, the network node 110 may use a transmit beam to transmit (e.g., with repetitions) each SSB or CSI-RS at multiple times within the same reference signal resource set so that the UE 120 can perform a beam sweep over multiple receive beams in multiple transmission instances. For example, if the network node 110 has a set of N transmit beams and the UE 120 has a set of M receive beams, the SSB or CSI-RS may be transmitted on each of the N transmit beams M times such that the UE 120 may receive M instances of the SSB or CSI-RS per transmit beam. In other words, for each transmit beam of the network node 110, the UE 120 may perform a beam sweep through the receive beams of the UE 120. As a result, the first beam management procedure may enable the UE 120 to measure an SSB or CSI-RS on different transmit beams using different receive beams to support selection of one or more transmit/receive beam pair(s) (e.g., a pairing between a transmit beam of the network node 110 and a receive beam of the UE 120). The UE 120 may report the measurements to the network node 110 to enable the network node 110 to select one or more beam pairs for communication between the network node 110 and the UE 120.

As shown in FIG. 3, example 310 may include the network node 110 and the UE 120 communicating to perform beam management using SSB transmissions or CSI-RS transmissions. Example 310 depicts a second beam management procedure (e.g., P2 beam management). The second beam management procedure may be referred to as a beam refinement procedure, a base station beam refinement procedure, a network node beam refinement procedure, and/or a transmit beam refinement procedure, among other examples. As shown in FIG. 3 and example 310, SSBs and/or CSI-RSs may be configured to be transmitted from the network node 110 to the UE 120. The SSBs may be periodic, and the CSI-RSs may be configured to be aperiodic (e.g., using DCI). The second beam management procedure may include the network node 110 performing a beam sweep over one or more transmit beams. The one or more transmit beams may be a subset of all transmit beams associated with the network node 110 (e.g., determined based at least in part on measurements reported by the UE 120 in connection with the first beam management procedure). The network node 110 may transmit an SSB or a CSI-RS using each transmit beam of the one or more transmit beams for beam management. The UE 120 may measure each SSB or CSI-RS using a single (e.g., a same) receive beam (e.g., determined based at least in part on measurements performed in connection with the first beam management procedure). The second beam management procedure may enable the network node 110 to select a best transmit beam based at least in part on measurements of the SSBs and/or CSI-RSs (e.g., measured by the UE 120 using the single receive beam) reported by the UE 120.

As shown in FIG. 3, example 320 depicts a third beam management procedure (e.g., P3 beam management). The third beam management procedure may be referred to as a beam refinement procedure, a UE beam refinement procedure, a receive beam refinement procedure, and/or a UE beam management procedure, among other examples. As shown in FIG. 3 and example 320, one or more SSBS or CSI-RSs may be configured to be transmitted from the network node 110 to the UE 120. The SSBs may be configured to be periodic, and the CSI-RSs may be configured to be aperiodic (e.g., using DCI). The third beam management process may include the network node 110 transmitting the one or more SSBs or CSI-RSs using a single transmit beam (e.g., determined based at least in part on measurements reported by the UE 120 in connection with the first beam management procedure and/or the second beam management procedure). To enable the UE 120 to perform receive beam sweeping, the network node 110 may use a transmit beam to transmit (e.g., with repetitions) an SSB or CSI-RS at multiple times within the same reference signal resource set such that UE 120 can sweep through one or more receive beams in multiple transmission instances. The one or more receive beams may be a subset of all receive beams associated with the UE 120 (e.g., determined based at least in part on measurements performed in connection with the first beam management procedure and/or the second beam management procedure). The third beam management procedure may enable the UE 120 to select a best receive beam based at least in part on measurements of the SSBs or CSI-RSs and/or may enable the network node 110 to select a best receive beam for the UE 120 based at least in part on reported measurements received from the UE 120 (e.g., measurements of the SSB and/or CSI-RS using the one or more receive beams).

In some cases, the UE 120 and the network node 110 may use beamforming to improve performance associated with downlink and/or uplink communication over a millimeter wave (mmW) channel. For example, a mmW channel (e.g., in FR2 and/or FR4) may suffer from high propagation loss because mmW signals have a higher frequency and a shorter wavelength than various other radio waves used for communications (e.g., sub-6 GHz communications in FR1). As a result, mmW signals often have shorter propagation distances, may be subject to atmospheric attenuation, and/or may be more easily blocked and/or subject to penetration loss through objects or other obstructions, among other examples. For example, a mmW signal may be reflected by lamp posts, vehicles, glass/windowpanes, and/or metallic objects, may be diffracted by edges or corners of buildings and/or walls, and/or may be scattered via irregular objects such as walls and/or human bodies (e.g., a hand blocking an antenna module when a device is operated in a gaming mode). Accordingly, beamforming may be used at both the UE 120 and the network node 110 to counter the propagation loss in a mmW channel and thereby improve performance for mmW communication. For example, to achieve a beamforming gain on a downlink, the network node 110 may generate a downlink transmit beam that is steered in a particular direction, and the UE 120 may generate a corresponding downlink receive beam. Similarly, to achieve a beamforming gain on an uplink, the UE 120 may generate an uplink transmit beam that is steered in a particular direction, and the network node 110 may generate a corresponding uplink receive beam. In some cases, the UE 120 may be permitted to select the downlink receive beam to optimize reception of a downlink transmission from the network node 110 and/or may be permitted to select the uplink transmit beam to optimize reception at the network node 110 for an uplink transmission by the UE 120.

When the UE 120 generates a downlink receive beam and/or an uplink transmit beam, the UE 120 is typically expected to use a beam with a maximum number of antenna elements on a best antenna panel in order to achieve a maximum beamforming gain. For example, the UE 120 may be equipped with one or more antenna panels that each include multiple antenna elements, where each antenna element may include one or more sub-elements to radiate or receive radio frequency (RF) signals. For example, a single antenna element may include a first sub-element cross-polarized with a second sub-element that can be used to independently transmit cross-polarized signals. The antenna elements may include patch antennas, dipole antennas, or other types of antennas arranged in a linear pattern, a two dimensional pattern, or another pattern. A spacing between antenna elements may be such that signals with a desired wavelength transmitted separately by the antenna elements may interact or interfere (e.g., to form a desired beam). For example, given an expected range of wavelengths or frequencies, the spacing may provide a quarter wavelength, half wavelength, or other fraction of a wavelength of spacing between neighboring antenna elements to allow for interaction or interference of signals transmitted by the separate antenna elements within that expected range. Accordingly, the shape of a beam (e.g., the amplitude, width, and/or presence of side lobes) and the direction of the beam (e.g., an angle of the beam relative to a surface of the antenna panel) can be dynamically controlled to achieve a maximum beamforming gain by selecting a beam with a largest number of antenna elements on the best antenna panel (e.g., an antenna panel associated with strongest RSRP measurements).

However, in some cases, using a beam with a largest or maximum number of antenna elements and/or using a beam on the best antenna panel may be associated with one or more drawbacks. For example, power consumption at the UE 120 may generally be related to the number of antenna elements used to form a beam, whereby using a beam with a maximum number of antenna elements may increase power consumption at the UE 120. Furthermore, in cases where the UE 120 generates a downlink receive beam in favorable channel conditions (e.g., low pathloss), the receive chain of the UE 120 may saturate such that using a maximum number of antenna elements increases power consumption without offering any increase to the achievable beamforming gain (e.g., the same beamforming gain may be achieved using fewer antenna elements). Furthermore, in some cases, the best antenna panel (in terms of achievable beamforming gain) may not be preferable due to other constraints at the UE 120. For example, the UE 120 may be experiencing a thermal impact (e.g., overheating) in one or more hardware blocks that coexist with (e.g., are included in or in proximity to) the best antenna panel. In such cases, the UE 120 may prefer to use a different antenna panel that does not coexist with (e.g., is not included in or in proximity to) the one or more hardware blocks experiencing the thermal impact in order to control temperature via the antenna elements that are used to generate a beam. Additionally, or alternatively, the UE 120 may be subject to one or more maximum permissible exposure (MPE) restrictions that limit a peak effective isotropic radiated power (EIRP) that can be directed toward the human body due to potential dangers to human tissue near the UE 120 (e.g., handheld mobile phones and/or desktop devices that may be used in close proximity to the user). Accordingly, when one or more beams on the best antenna panel are subject to an MPE restriction, the UE 120 may prefer to generate a transmit beam using a different antenna panel with beams that are not subject to an MPE restriction or are subject to lesser MPE restrictions than the beams on the best antenna panel.

However, in some cases, using a beam with a fewer number of antenna elements and/or a beam on an antenna panel other than the best antenna panel may degrade performance (e.g., by reducing the beamforming gain and thereby reducing an uplink or downlink data rate). Accordingly, some aspects described herein relate to techniques and apparatuses to enable throughput-constrained beam management, where a UE 120 may use a beam on a preferred antenna panel with a minimum number of antenna elements that can satisfy an application layer throughput requirement (e.g., a requested or required uplink or downlink data rate). For example, in some aspects, the UE 120 may identify one or more candidate beams on a best antenna panel and/or a preferred antenna panel that can satisfy the application layer throughput requirement, and may select a candidate beam that can satisfy the application layer throughput requirement using a fewest number of antenna elements. In this way, the UE 120 may select a serving beam that satisfies the application layer throughput requirement at a lowest level, which may reduce power consumption without compromising performance. Furthermore, in cases where one or more beams on the preferred antenna panel (e.g., an antenna panel not subject to a thermal impact or an MPE restriction) satisfy the application layer throughput requirement, the serving beam may be a beam that can satisfy the application layer throughput requirement with a fewest number of antenna elements on the preferred antenna panel. In this way, the UE 120 may dynamically control which antenna panel is used to generate the beam, to mitigate other potential conditions (e.g., a thermal impact or an MPE restriction) without compromising performance by selecting a beam that can satisfy the application layer throughput requirement on the preferred antenna panel.

As indicated above, FIG. 3 is provided as an example of beam management procedures. Other examples of beam management procedures may differ from what is described with respect to FIG. 3. For example, the UE 120 and the network node 110 may perform the third beam management procedure before performing the second beam management procedure, and/or the UE 120 and the network node 110 may perform a similar beam management procedure to select a UE transmit beam.

Figure 4A:
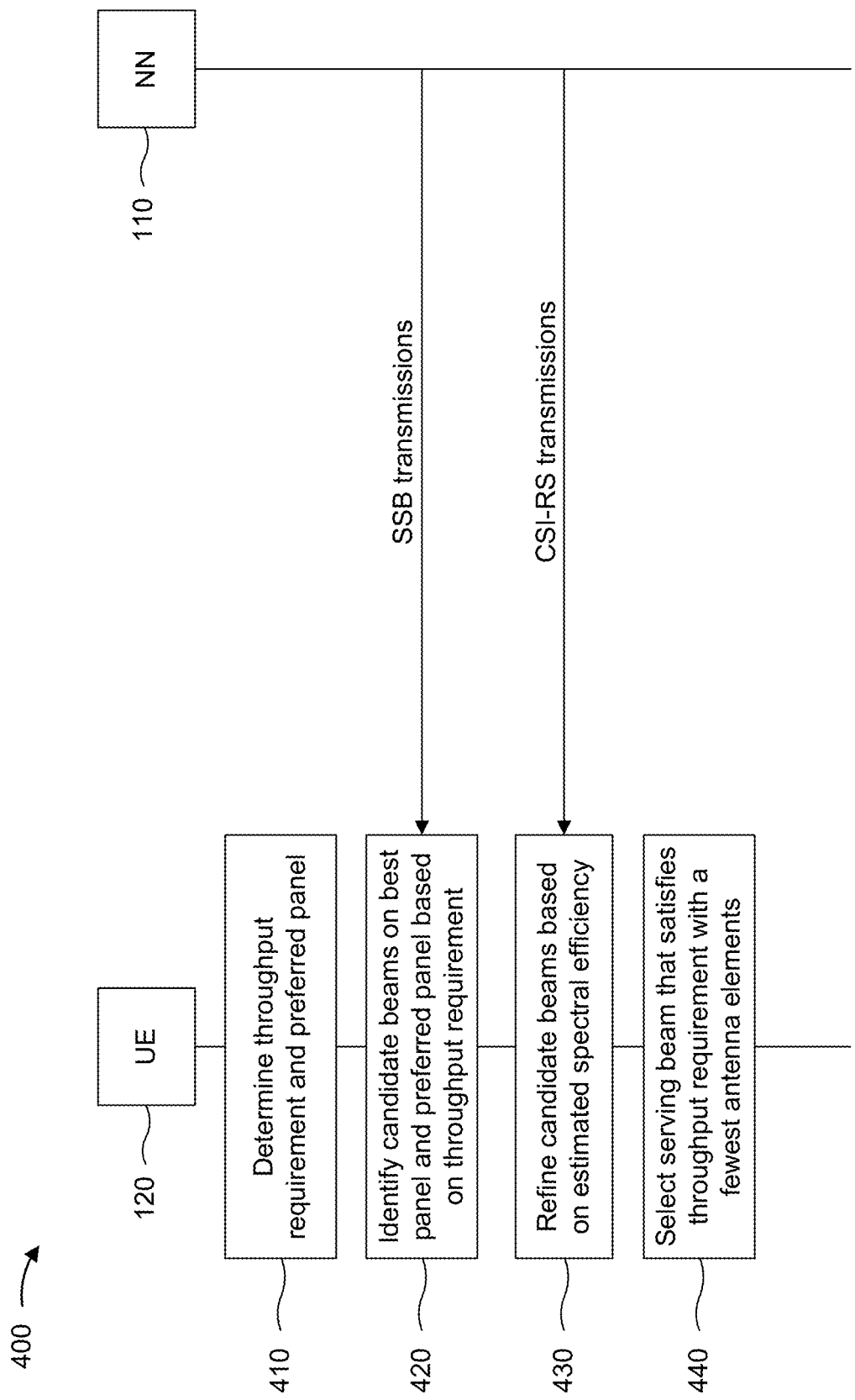

FIGS. 4A-4B are diagrams illustrating an example 400 associated with throughput-constrained beam management, in accordance with the present disclosure. As shown in FIG. 4A, example 400 includes communication between a network node 110 and a UE 120 in a wireless network (e.g., wireless network 100) via a wireless access link, which may include an uplink and a downlink.

As shown in FIG. 4A, and by reference number 410, the UE 120 may determine an application layer throughput requirement and a preferred antenna panel to use to generate a beam for downlink and/or uplink communication. For example, in some aspects, the UE 120 may be configured to determine one or more applications that are running on the UE 120, and may determine the application layer throughput requirement based on a minimum downlink and/or uplink data rate for the one or more applications (e.g., in kilobits per second (kbps), megabits per second (Mbps), or gigabits per second (Gbps)). For example, in some aspects, the minimum downlink and/or uplink data rate may be determined based on an application type or category. For example, one or more low or normal data rate applications (e.g., web browsing or a Voice over Internet Protocol (VoIP) call) may be associated with a first application layer throughput requirement (e.g., a value in a range from 0 to 10 Mbps), one or more high data rate applications (e.g., 4K video streaming or gaming) may be associated with a second application layer throughput requirement (e.g., a value in a range from 10 to 100 Mbps), and/or one or more peak data rate applications (e.g., a network speed test or a large file download) may be associated with a third application layer throughput requirement (e.g., a value above 100 Mbps). Additionally, or alternatively, one or more applications running on the UE 120 may be associated with an application-specific throughput requirement. Accordingly, as described herein, the UE 120 may generally have a capability to determine one or more applications that are running on the UE 120 (e.g., including applications running in the foreground and/or the background) and to determine a total application layer throughput requirement (e.g., downlink and/or uplink data rate) for the running application(s).

Furthermore, in some aspects, the UE 120 may be configured to determine the preferred antenna panel based at least in part on one or more settings of the UE 120. For example, in some aspects, the UE 120 may have a capability to identify one or more antenna panels that are impacted by a condition of the UE 120, and may identify the preferred antenna panel to mitigate or otherwise manage the condition of the UE 120. For example, in some aspects, the UE 120 may have a capability to identify one or more hardware blocks that are causing or experiencing a thermal impact (e.g., overheating) and to identify one or more antenna panels that coexist with the hardware blocks that are causing or experiencing the thermal impact. Accordingly, the settings of the UE 120 may designate an antenna panel that does not coexist with the hardware blocks that are causing or experiencing the thermal impact as the preferred antenna panel until the thermal impact has been adequately resolved. Additionally, or alternatively, the UE 120 may detect that a hand or other human body part is in proximity to an antenna panel such that one or more beams on the antenna panel are subject to an MPE restriction (e.g., to reduce a maximum transmit power via the one or more beams and/or disallowing the UE 120 from using the one or more beams subject to the MPE restriction). Accordingly, in this example, the settings of the UE 120 may designate an antenna panel that is not subject to the MPE restriction (e.g., an antenna panel facing away from the hand or other human body part causing the MPE issue) as the preferred antenna panel until the MPE issue has been adequately resolved. Additionally, or alternatively, the settings of the UE 120 may designate the preferred antenna panel to mitigate or manage other suitable conditions of the UE 120 (e.g., low battery power).

As further shown in FIG. 4A, and by reference number 420, the UE 120 may use measurements associated with a set of SSBs transmitted by the network node 110 to identify a set of candidate beams including one or more candidate beams on a best antenna panel and/or the preferred antenna panel that can satisfy the application layer throughput requirement. For example, the network node 110 may be configured to transmit a synchronization signal (SS) burst set at periodic intervals (e.g., every X milliseconds), where the SS burst set may include multiple SS bursts, with each SS burst including one or more SSBs that carry a PSS, an SSS, and/or a physical broadcast channel (PBCH). In some aspects, multiple SSBs may be included in an SS burst (e.g., with transmission on different beams), and the PSS, the SSS, and/or the PBCH may be the same across each SSB in the SS burst. Accordingly, different SSBs may be beam-formed differently (e.g., transmitted using different beams), and may be used for cell search, cell acquisition, beam management, and/or beam selection. For example, in some aspects, the UE 120 may monitor and/or measure SSBs using different receive beams during an initial network access procedure, a beam selection procedure, and/or a beam refinement procedure, among other examples. Accordingly, because the SSB transmissions are always-on signaling that the UE 120 can use to identify strong beams that can satisfy the application layer throughput requirements, the UE 120 may use RSRP measurements associated with the SSB transmissions to identify the best antenna panel and to identify the candidate beam(s) on the best antenna panel and/or the preferred antenna panel that can satisfy the application layer throughput requirement.

For example, based on RSRP measurements associated with the SSB transmissions received by the UE 120, the UE 120 may determine, among multiple antenna panels of the UE 120, an antenna panel that provides a maximum beamforming gain. Accordingly, the antenna panel that provides the maximum beamforming gain may be designated the best antenna panel, which may be the same as or different from the preferred antenna panel. In some aspects, to identify the candidate beams on the best antenna panel and/or the preferred antenna panel, the UE 120 may perform a sweep of all beam levels on the best antenna panel and the preferred antenna panel, where each beam level corresponds to a number of antenna elements that are used to generate a beam. For example, if an antenna panel includes eight (8) antenna elements, the UE 120 may sweep through all beams at a lowest beam level (e.g., an omnidirectional beam with a relatively low beamforming gain using one (1) antenna element), a next-lowest beam level (e.g., relatively wide beams with a higher beamforming gain using two (2) antenna elements), all the way through a highest beam level (very narrow beams with a maximum beamforming gain using eight (8) antenna elements). Accordingly, the UE 120 may measure an RSRP associated with an SSB transmission for each beam at each beam level on both the best antenna panel and the preferred antenna panel, and may use the RSRP measurement associated with the SSB received via each beam to estimate the application layer throughput associated with the respective beam. The UE 120 may then generate a set of candidate beams that includes one or more candidate beams on the best antenna panel and/or the preferred antenna panel that can satisfy the application layer throughput requirement. For example, in some aspects, the UE 120 may map the application layer throughput requirement to an RSRP threshold, and the set of candidate beams may include up to a configurable number of strong beams on the best panel and/or the preferred panel with RSRP measurements that satisfy the RSRP threshold.

In some aspects, to map the application layer throughput requirement to the RSRP threshold, the UE 120 may map the application layer throughput requirement to a physical layer throughput requirement. For example, the UE 120 may scale the application layer throughput requirement according to one or more header sizes to determine the physical layer throughput requirement. For example, the UE 120 may determine a smallest Internet Protocol (IP) packet size that can satisfy the application layer throughput requirement, and may determine a header size associated with each IP packet (e.g., a combined header size for a Packet Data Convergence Protocol (PDCP) header, a MAC header, and a radio link control (RLC) header associated with each packet). Accordingly, the UE 120 may determine the physical layer throughput requirement as the sum of the application layer throughput requirement and the header size, where the application layer throughput requirement may be scaled according to a parameter, $\alpha$, that is based on the application layer throughput requirement (e.g., $\alpha$ may have a value of 1.07 in an example where a smallest IP packet size is 100 bytes and a combined header size is 7 bytes based on a 3 byte PDCP header, a 2 byte MAC header, and a 2-byte RLC header). Accordingly, the UE 120 may determine the physical layer throughput requirement by scaling the application layer throughput requirement according to the value of $\alpha$ (e.g., physical layer throughput requirement=$\alpha\times$application layer throughput requirement), and may then map the physical layer throughput requirement to a spectral efficiency requirement.

For example, in some aspects, the UE 120 may map the physical layer throughput requirement to an uplink spectral efficiency requirement and/or a downlink spectral efficiency requirement. For example, an uplink physical layer throughput requirement may be defined as the product of the number of active uplink component carriers, an uplink duty cycle, a resource block (RB) allocation for a given subcarrier spacing, and the uplink spectral efficiency. For example, the UE 120 may map the physical layer throughput requirement to an uplink spectral efficiency based on an equation of the form:

$$PHY_{UL}=CC_{UL}\times DC_{UL}\times N_{RB}\times 12\times SCS\times SPEFF_{UL}$$

where $PHY_{UL}$ is the physical layer throughput requirement, $CC_{UL}$ is the number of active uplink component carriers (e.g., with a default value of one (1) assuming a primary component carrier only), $DC_{UL}$ is the uplink duty cycle (e.g., defined according to an RRC-configured time division duplexing (TDD) pattern using a scaling factor, X, where X has a default value of one (1) and X=½ means that the duty cycle is half of the RRC-configured TDD pattern in a two-user scenario), $N_{RB}$ is the full RB allocation for a given subcarrier spacing (e.g., 66 RBs for a 100 MHz bandwidth and a 120 kHz subcarrier spacing), SCS is the subcarrier spacing (in Hertz (Hz)), and $SPEFF_{UL}$ is the uplink spectral efficiency. Similarly, a downlink physical layer throughput requirement may be defined as the product of the number of active downlink component carriers, a downlink duty cycle, the RB allocation for the given subcarrier spacing, and the downlink spectral efficiency, whereby the UE 120 may map the physical layer throughput requirement to a downlink spectral efficiency based on an equation of the form:

$$PHY_{DL} = CC_{DL} \times DC_{DL} \times N_{RB} \times 12 \times SCS \times SPEFF_{DL}$$

where $PHY_{UL}$ is the physical layer throughput requirement, $CC_{DL}$ is the number of active downlink component carriers (e.g., with a default value of one (1) assuming a primary component carrier only), $DC_{DL}$ is the downlink duty cycle (e.g., defined according to the RRC-configured TDD pattern), and $SPEFF_{DL}$ is the downlink spectral efficiency. Accordingly, based on the estimated uplink and/or downlink spectral efficiency requirement, the UE 120 may determine an uplink and/or downlink signal-to-noise ratio (SNR) requirement as SPEFF=log 2(1+sum($SNR_{UL}$, $SNR_{DL}$)), which may then be mapped to the RSRP threshold at which an RSRP measurement associated with an SSB satisfies the application layer throughput requirement, as follows:

$$SNR_{DL} = RSRP_{SSB} - (NF_{UE} + 10 \log_{10}(SCS) + 10 \log_{10}(num\_antennas) - 174),$$

where $RSRP_{SSB}$ is the RSRP measurement of an SSB in decibels (dB), $NF_{UE}$ is a noise figure that measures SNR degradation at the UE 120, num_antennas is a number of antenna elements, and $SNR_{DL}$ is the estimated downlink SNR requirement (in dB). Furthermore, the uplink SNR may be similarly estimated, except the uplink SNR may further consider a maximum transmit power that may be updated every 10 milliseconds on a per-beam basis based on any MPE impact or other transmit power constraints in effect at the UE 120. For example, in some aspects, an uplink SNR requirement may be mapped to the RSRP threshold at which an RSRP measurement associated with an SSB satisfies the application layer throughput requirement, as follows:

$$SNR_{UL} = Pmax + RSRP_{SSB} - TxPower_{BS} - (NF_{BS} + 10 \log_{10}(SCS) - 174),$$

where Pmax is the maximum transmit power associated with the beam, $RSRP_{SSB} - TxPower_{BS}$ defines a path loss between the UE 120 and the network node 110 based on a difference between the received power of a downlink reference signal and an actual transmit power used by the network node 110, $NF_{BS}$ is a noise figure that measures SNR degradation at the network node 110, ($NF_{BS}$+10 $\log_{10}$(SCS)−174) defines an estimated noise power at the network node 110, and $SNR_{UL}$ is the uplink SNR requirement (in dB).

Accordingly, as described herein, the UE 120 may generally sweep all beam levels on both the best antenna panel and the preferred antenna panel to measure an RSRP associated with an SSB per beam, and may use the RSRP measurement associated with the SSB received via each respective beam to estimate the application layer throughput associated with each beam (e.g., using the various equations provided above to map the RSRP measurement to an application layer throughput based on one or more intermediate mappings to an SNR value, a spectral efficiency, and a physical layer throughput). Additionally, or alternatively, the application layer throughput requirement may be mapped to an RSRP threshold as described above, whereby the RSRP measurement associated with the SSB received via each respective beam may be compared with the RSRP threshold.

As further shown in FIG. 4A, and by reference number 430, the UE 120 may refine the set of candidate beams based on an estimated spectral efficiency per candidate beam, where the spectral efficiency per candidate beam may be estimated based on one or more CSI-RS transmissions by the network node 110. For example, in some aspects, the UE 120 may sweep through each candidate beam in the set of candidate beams at one or more CSI-RS occasions, and may estimate a spectral efficiency associated with each CSI-RS transmission (e.g., using the various equations provided above) to confirm that the required application layer throughput can be achieved on the corresponding candidate beam. For example, in some aspects, the UE 120 may remove, from the set of candidate beams, one or more candidate beams associated with an estimated spectral efficiency that fails to satisfy the application layer throughput requirement.

As further shown in FIG. 4A, and by reference number 440, the UE 120 may select a serving beam to be used for uplink and/or downlink communication. For example, in some aspects, the serving beam may be selected for communication on a physical uplink control channel (PUCCH), a physical uplink shared channel (PUSCH), a physical downlink control channel (PDCCH), and/or a physical downlink shared channel (PDSCH). In some aspects, in cases where the preferred antenna panel differs from the best antenna panel (e.g., due to thermal or MPE mitigation taking precedence over optimizing an uplink or downlink data rate), the UE 120 may determine whether one or more candidate beams on the preferred antenna panel satisfy the application layer throughput requirement. In cases where there is at least one candidate beam on the preferred antenna panel that satisfies the application layer throughput requirement, the serving beam that is selected by the UE 120 may be a candidate beam on the preferred antenna panel that satisfies the application layer throughput requirement at a lowest beam level (e.g., with a fewest number of antenna elements). Alternatively, in cases where all of the candidate beams on the preferred antenna panel fail to satisfy the application layer throughput requirement, the serving beam that is selected by the UE 120 may be a candidate beam on the best antenna panel that satisfies the application layer throughput requirement at a lowest beam level.

For example, FIG. 4B illustrates an example 450 where the preferred antenna panel includes at least one candidate beam that satisfies the application layer throughput requirement and an example 460 where the preferred antenna panel does not include any candidate beams that satisfy the application layer throughput requirement. For example, as shown in FIG. 4B, the width of a beam may be related to the number of antenna elements that are used to form the beam, where a narrower beam may generally be associated with a larger number of antenna elements. As further shown in FIG. 4B, a beam that fails to satisfy the RSRP threshold mapped to the application layer throughput requirement (e.g., a beam that is not considered a candidate beam) is shown by a thin solid line, a beam that satisfies the RSRP threshold mapped to the application layer throughput requirement (e.g., a potential candidate beam) is shown by a dashed line, and a beam that satisfies the application layer throughput requirement with a minimum or fewest number of antenna elements is shown by a thick solid line. As shown in in example 450, the preferred panel includes a beam that satisfies the application layer throughput requirement, which may be selected as the serving beam. Alternatively, as shown in example 460, there are no beams on the preferred panel that satisfy the application layer throughput requirement, in which case a beam on the best antenna panel that satisfies the application layer throughput requirement with a fewest number of antenna elements may be selected as the serving beam. In this way, the UE 120 may select a serving beam that satisfies the application layer throughput requirement at a lowest level, which may reduce power consumption without compromising performance. Furthermore, in cases where one or more beams on the preferred antenna panel are able to satisfy the application layer throughput requirement, the serving beam may be selected on the preferred antenna panel to allow the UE 120 to mitigate or manage other potential conditions (e.g., a thermal impact or an MPE restriction) without compromising performance.

In some cases, however, the throughput-constrained beam management techniques described herein may be subject to certain challenges, such as imprecision in mapping an application layer throughput requirement to a physical layer beam metric (e.g., an RSRP measurement, an SNR measurement, or a virtual power headroom (VPHR) measurement) relied upon to restrict or otherwise constrain the beams that are eligible to select as a serving beam for downlink and/or uplink communication. For example, as described herein, throughput-constrained beam management may include mapping an application layer throughput requirement to a physical layer throughput, which may be challenging to convert in real-time for both uplink and downlink traffic. For example, overhead associated with upper (e.g., application) layers tends to be dynamic, whereby the same scaling factor cannot always be used to convert the application layer throughput to the physical layer throughput. Furthermore, a mapping from the physical layer throughput to a spectral efficiency may depend on several variables, including a number of activated component carriers, a number of allocated resource blocks, and/or a duty cycle, all of which are configured and/or activated by a network node 110 rather than fully controlled by the UE 120. Furthermore, mapping the spectral efficiency to an SNR metric depends on a rank that is determined by the network node 110 and not controlled by the UE 120, and a mapping from the SNR metric to another physical layer metric such as an RSRP measurement or a VPHR measurement is dependent on a noise figure at the network node 110, which is unknown to the UE 120 and therefore has to be estimated by the UE 120. Accordingly, because there are various factors that prevent a precise mapping from the application layer throughput requirement to the beam metric(s) ultimately used for beam selection, some aspects described herein (e.g., with reference to FIG. 5) relate to a self-correction mechanism that may be used to improve the throughput-constrained beam selection. Furthermore, some aspects described herein (e.g., with reference to FIG. 6) relate to a virtual serving beam tracking mechanism that may be used to maintain, for each beam associated with a network node 110, information indicating a virtual serving UE beam having a best beam metric per beam level and per antenna panel. In this way, when the UE 120 performs throughput-constrained beam selection, the UE 120 may refer to the virtual serving UE beam information to evaluate which beams can satisfy an application layer throughput requirement on a preferred panel with the fewest antenna elements.

As indicated above, FIGS. 4A-4B are provided as an example. Other examples may differ from what is described with regard to FIGS. 4A-4B.

Figure 5:
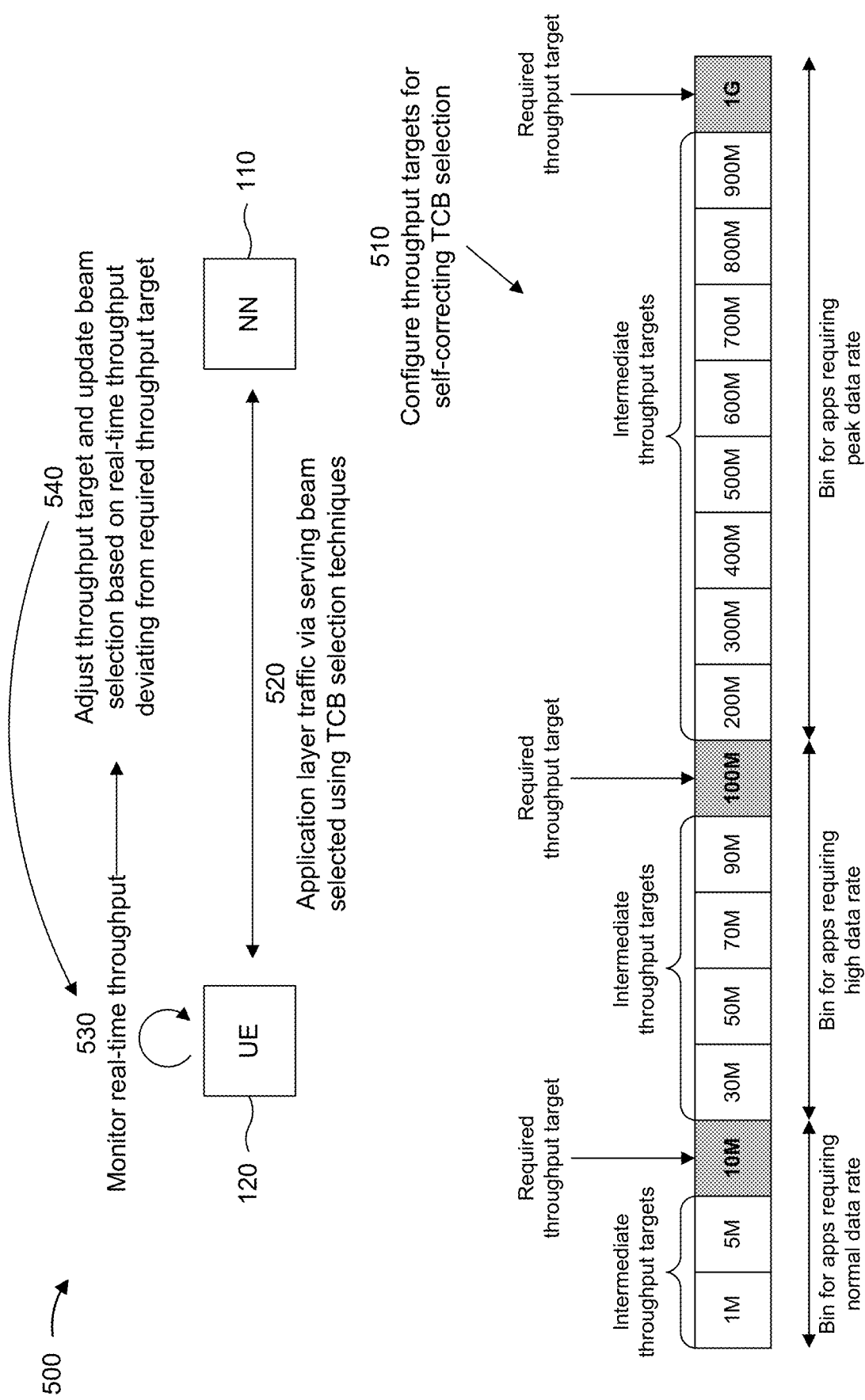
FIG. 5 is a diagram illustrating an example associated with throughput-constrained beam selection with self-correction, in accordance with the present disclosure.

FIG. 5 is a diagram illustrating an example 500 associated with throughput-constrained beam selection with self-correction, in accordance with the present disclosure. As shown in FIG. 5, example 500 includes communication between a network node 110 and a UE 120 in a wireless network (e.g., wireless network 100) via a wireless access link, which may include an uplink and a downlink.

As shown in FIG. 5, and by reference number 510, the UE 120 may configure various throughput targets to enable self-correction for a throughput-constrained beam selection procedure. For example, as described herein, an application running on the UE 120 in an application layer may generally be classified into a particular bin that defines a range for a target throughput rate for the application. For example, in one use case, a first bin may be defined for applications having a low or normal throughput requirement (e.g., web browsing or VoIP calls), a second bin may be defined for applications having a high throughput requirement (e.g., 4K video streaming or gaming), and a third bin may be defined for applications having a peak throughput requirement (e.g., network speed tests or large file downloads). In this example, the first bin may include application throughput rates in an interval from 0 to 10 Mbps (e.g., greater than 0 Mbps and less than or equal to 10 Mbps) with a required throughput target of 10 Mbps, the second bin may include application throughput rates in an interval from 10 to 100 Mbps (e.g., greater than 10 Mbps and less than or equal to 100 Mbps) with a required throughput target of 100 Mbps, and the third bin may include application throughput rates that exceed 100 Mbps with a required throughput target of 1 Gbps. It will be appreciated, however, that the number of bins and the application throughput ranges and/or required throughput targets described herein are examples only, and that more (e.g., four or more) or fewer (e.g., two) bins may be defined, and that the application throughput ranges and/or required throughput targets associated with the bins may vary in different examples. For example, in some aspects, the required throughput target associated with each bin may be defined or configured by an original equipment manufacturer (OEM) of the UE 120 or based on an estimation of the required throughput target by the UE 120.

In some aspects, as described above with reference to FIGS. 4A-4B, the UE 120 may generally determine one or more applications that are running on the UE 120 (e.g., including applications running in the foreground and/or the background) and may determine a total application layer throughput requirement (e.g., downlink and/or uplink data rate) for the one or more applications running in the application layer. The UE 120 may then perform throughput-constrained beam management by mapping the application layer throughput requirement to a physical layer beam metric (e.g., an RSRP parameter, an SNR parameter, and/or a VPHR parameter, among other examples), and may use the physical layer beam metric to select a beam on a preferred panel that can satisfy the required throughput target (e.g., a required or requested downlink or uplink data rate) using a minimum number of antenna elements. For example, in a scenario where a web browsing application is running on the UE 120, the UE 120 may set a target throughput rate to 10 Mbps, and may select a beam on a preferred panel that can achieve a throughput rate of 10 Mbps using a minimum number of antenna elements. In another example, in a scenario where an application running on the UE 120 is streaming 4K video, the UE 120 may set a target throughput rate to 100 Mbps, and may select a beam on a preferred panel that can achieve a throughput rate of 100 Mbps using a minimum number of antenna elements. However, due to the potential imprecision in a mapping from the application layer throughput to the physical layer beam metric (e.g., for at least the reasons discussed in more detail elsewhere herein), the beam that the UE 120 selects using throughput-constrained beam selection may provide a real-time throughput rate that is lower or higher than the target throughput rate.

Accordingly, in some aspects, the UE 120 may configure a first set of throughput targets, which may be referred to herein as required throughput targets, where each application layer bin includes one (1) required throughput target. For example, as shown in FIG. 5, the required throughput targets may include a 10 Mbps required throughput target for applications having a low or normal data rate requirement, a 100 Mbps required throughput target for applications having a high data rate requirement, a 1 Gbps required throughput target for applications having a peak data rate requirement, or the like. Furthermore, in some aspects, the UE 120 may configure a second set of throughput targets, which may be referred to herein as intermediate throughput targets, where one or more intermediate throughput targets are included in each application layer bin. For example, as shown in FIG. 5, the first bin for applications with a low or normal data rate may include intermediate throughput targets of 1 Mbps and 5 Mbps, the second bin for applications with a high data rate may include intermediate throughput targets from 30 Mbps to 90 Mbps in 20 Mbps increments, and the third bin for applications with a peak data rate may include intermediate throughput targets from 200 Mbps to 900 Mbps in 100 Mbps increments. In this way, the UE 120 may configure the intermediate throughput targets in addition to the required throughput targets that are configured by the OEM of the UE 120 and/or based on the estimation of the UE 120, whereby the intermediate throughput targets may provide increased granularity to enable self-correction for a throughput-constrained beam selection based on real-time metric (e.g., throughput rate) monitoring.

For example, as shown by reference number 520, the UE 120 may communicate with the network node 110 to transmit uplink application layer traffic and/or receive downlink application layer traffic via a serving beam that the UE 120 selects using the throughput-constrained beam selection techniques described herein (e.g., with reference to FIGS. 4A-4B). In some aspects, when the UE 120 initially selects the serving beam (e.g., a beam that can satisfy an application layer throughput requirement with a fewest number of antenna elements), the UE 120 may set a target throughput rate to the required throughput target associated with the application(s) running on the UE 120. For example, in a scenario where the application layer bins and required throughput targets are configured as shown in FIG. 5, the target throughput rate may be set to 10 Mbps when the selected serving beam is used to communicate web browsing or VoIP traffic, to 100 Mbps when the selected serving beam is used to communicate 4K streaming video or gaming traffic, or to 1 Gbps when the selected serving beam is used to communicate network speed test or large file download traffic, among other examples. As shown by reference number 530, the UE 120 may then monitor a real-time throughput rate associated with the current serving beam, and may use the intermediate throughput targets to the extent needed to self-correct the throughput-constrained beam selection (e.g., due to imprecision in the mapping from application layer throughput requirements to physical layer beam metrics).

For example, as shown by reference number 540, the UE 120 may adjust (e.g., increase or decrease) the current target throughput rate and update the throughput-constrained beam selection accordingly based on a determination that the current real-time throughput rate deviates from the current target throughput rate. Furthermore, as shown, the UE 120 may continue to monitor the real-time throughput rate and adjust the current target throughput rate while the monitored real-time throughput rate deviates from the current target throughput rate. In some aspects, the UE 120 may adjust the current target throughput rate and/or update the throughput-constrained beam selection when a difference between the monitored real-time throughput rate and the current target throughput rate satisfies (e.g., equals or exceeds) a threshold (e.g., to prevent the UE 120 from switching the serving beam when the difference between the monitored real-time throughput rate and the current target throughput rate is insignificant). Additionally, or alternatively, a hysteresis parameter may control the adjustment of the target throughput rate and/or the updated throughput-constrained beam selection (e.g., to prevent the UE 120 from ping ponging between different serving beams). For example, in some aspects, the UE 120 may adjust the current target throughput rate and/or update the throughput-constrained beam selection only in cases where a number of evaluations of the real-time throughput rate and/or an elapsed time since a last change to the serving beam satisfies (e.g., equals or exceeds) the hysteresis parameter.

For example, in cases where the required throughput target associated with the serving beam exceeds the current real-time throughput rate by a value that equals or exceeds the applicable threshold (e.g., such that the serving beam does not provide the required application layer performance), the UE 120 may increase the target throughput rate by one or more increments and update the throughput-constrained beam selection accordingly (e.g., selecting a candidate beam on a preferred panel that can satisfy the higher target throughput rate with a fewest number of antenna elements). The UE 120 may then continue to monitor the real-time throughput rate using the reselected serving beam, increase the target throughput rate, and update the throughput-constrained beam selection (subject to the hysteresis parameter) until the real-time throughput rate exceeds the required throughput target and/or the difference between the real-time throughput rate and the required throughput target fails to satisfy (e.g., is less than) the applicable threshold. For example, in a scenario where the initial target throughput rate is 100 Mbps (e.g., based on the required throughput target for a 4K video streaming application) and the actual real-time throughput rate associated with the serving beam is 80 Mbps, the UE 120 may set the target throughput rate to an intermediate throughput rate that is higher than the required throughput target (e.g., 200 Mbps) and update the throughput-constrained beam selection accordingly. If the real-time throughput rate is still lower than the required throughput target of 100 Mbps, the UE 120 may continue increment the throughput target and update the throughput-constrained beam selection based on the incremented throughput target until the real-time throughput rate exceeds the required throughput target and/or the difference between the real-time throughput rate and the required throughput target fails to satisfy the applicable threshold.

Additionally, or alternatively, in cases where the current real-time throughput rate exceeds the required throughput target by a value that equals or exceeds the applicable threshold (e.g., such that the serving beam consumes more power than necessary to provide the required application layer performance), the UE 120 may decrease the target throughput rate by one or more increments and update the throughput-constrained beam selection accordingly (e.g., selecting a candidate beam on a preferred panel that can satisfy the reduced target throughput rate with a fewest number of antenna elements). The UE 120 may then continue to monitor the real-time throughput rate using the reselected serving beam, reduce the target throughput rate, and update the throughput-constrained beam selection (subject to the hysteresis parameter) until the real-time throughput rate is less than the required throughput target and/or the difference between the real-time throughput rate and the required throughput target fails to satisfy (e.g., is less than) the applicable threshold. In some aspects, the UE 120 may then increase the target throughput rate by one (1) increment and reselect the serving beam to ensure that the actual throughput rate associated with the serving beam is greater than the required throughput target. For example, in a scenario where the initial target throughput rate is 100 Mbps and the actual real-time throughput rate associated with the serving beam is 120 Mbps, the UE 120 may set the target throughput rate to an intermediate throughput rate that is lower than the required throughput target (e.g., 90 Mbps) and update the throughput-constrained beam selection accordingly. If the real-time throughput rate is still greater than the required throughput target of 100 Mbps, the UE 120 may continue to decrease the target throughput rate and update the throughput-constrained beam selection based on the reduced target throughput rate until the real-time throughput rate is less than the required throughput target. The UE 120 may then increase the target throughput rate by one increment and update the throughput-constrained beam selection. For example, if the actual real-time throughput rate exceeds 100 Mbps when the serving beam is selected based on a target throughput rate of 90 Mbps and becomes less than 100 Mbps when the serving beam is selected based on a target throughput rate of 70 Mbps, the UE 120 may increment the target throughput rate to 90 Mbps and update the throughput-constrained beam selection accordingly.

As indicated above, FIG. 5 is provided as an example. Other examples may differ from what is described with regard to FIG. 5.

Figure 6:
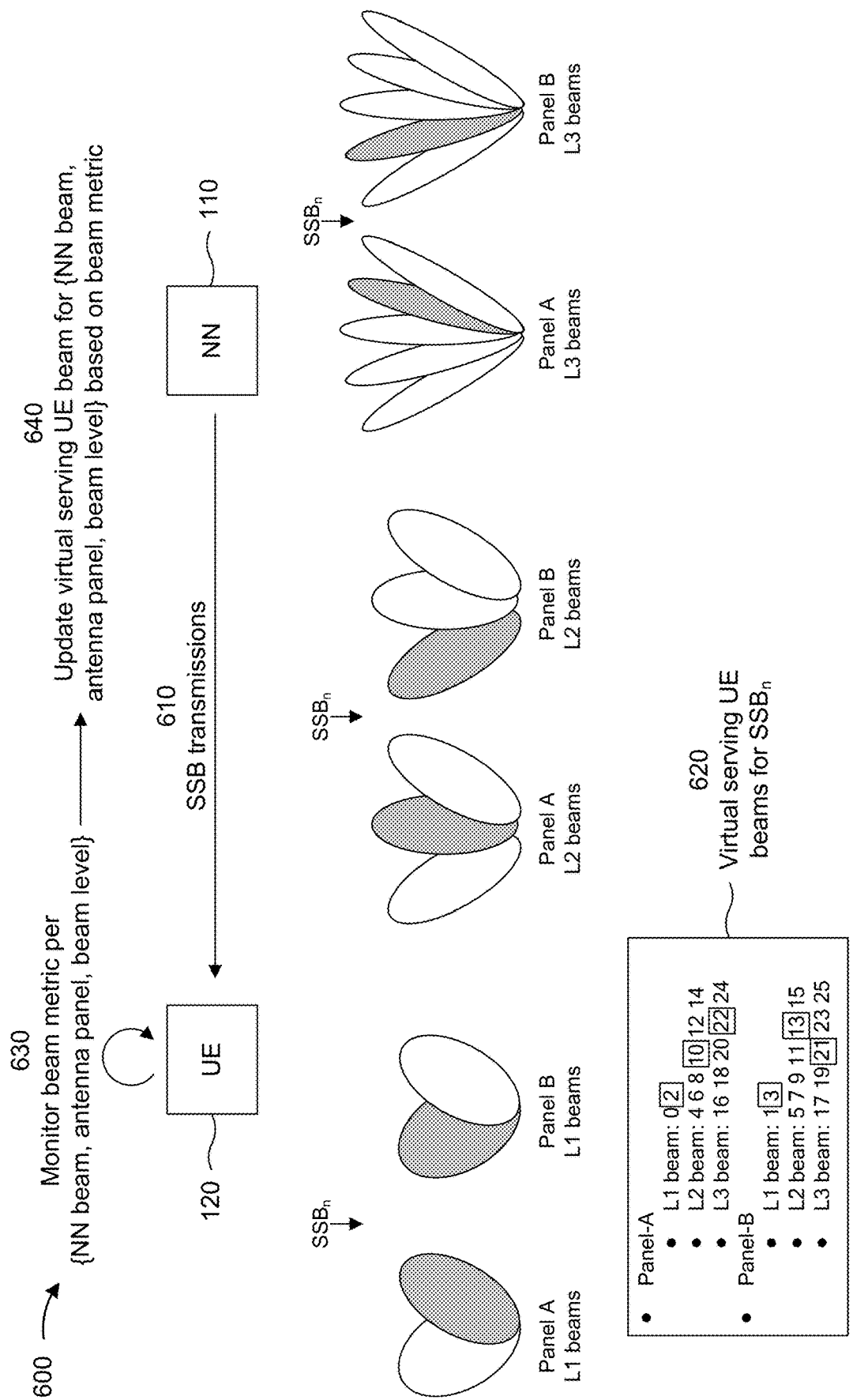
FIG. 6 is a diagram illustrating an example associated with throughput-constrained beam selection with virtual serving beam tracking, in accordance with the present disclosure.

FIG. 6 is a diagram illustrating an example 600 associated with throughput-constrained beam selection with virtual serving beam tracking, in accordance with the present disclosure. As shown in FIG. 6, example 600 includes communication between a network node 110 and a UE 120 in a wireless network (e.g., wireless network 100) via a wireless access link, which may include an uplink and a downlink.

In some aspects, as described above with reference to FIGS. 4A-4B, the UE 120 may determine one or more applications that are running on the UE 120 (e.g., including applications running in the foreground and/or the background) and may determine a total application layer throughput requirement (e.g., downlink and/or uplink data rate) for the one or more applications running in the application layer. The UE 120 may then perform throughput-constrained beam management by mapping the application layer throughput requirement to a physical layer beam metric, and may use the physical layer beam metric to select a beam on a preferred panel that can satisfy the required throughput target using a minimum number of antenna elements. However, when the UE 120 and the network node 110 communicate via the serving beam, the UE 120 may need to track and switch (e.g., reselect) the serving beam in order to maintain the desired throughput rate and/or avoid disruptions to downlink and/or uplink communication, especially in high mobility use cases and/or environments where there may be significant fading or path loss. For example, to enable beam tracking and/or serving beam switching, the UE 120 may generally measure one or more beams associated with the network node 110 and one or more beams associated with the UE 120 (e.g., based on SSB and/or CSI-RS transmissions by the network node 110) at various occasions, and may store (e.g., in a local memory or database) information that indicates a beam metric associated with each beam (e.g., an RSRP measurement for a downlink beam or a maximum power (Pmax) parameter for an uplink beam).

Accordingly, in cases where the information stored in the local memory, database, or other suitable location determines that the beam metric associated with a non-serving beam is better than the current serving beam being used to communicate downlink and/or uplink traffic, the UE 120 may change the serving beam such that the non-serving beam becomes the serving beam. However, the beam reselection mechanism is dependent on the stored beam metric, which could potentially be based on a stale measurement. For example, the stored beam metric may be stale (e.g., potentially inaccurate) in cases where the UE 120 is in a high mobility scenario (e.g., a high-speed train) or experiencing a significant change to a wireless channel caused by environmental factors (e.g., obstacles or other blockage in the environment). As a result, the throughput-constrained beam selection performed by the UE 120 may result in a suboptimal serving beam, because the throughput-constrained beam selection techniques described herein require that the UE 120 evaluate the best beam at each beam level (e.g., from narrow beams with a small coverage area and a large beamforming gain to wide beams with a large coverage area and a smaller beamforming gain) on each antenna panel to determine whether the UE 120 can use a beam on the preferred panel (e.g., based on thermal considerations) that can satisfy requested or required uplink and/or downlink data rates with a minimum number of antenna elements. In cases where the beam evaluation is based on stale beam measurements or stale beam metrics, there may be a mismatch between the selected serving beam and the requested or required data rate, which could result in throughput degradation (e.g., a failure to meet the requested or required data rate). Accordingly, as described herein, the UE 120 may maintain information that indicates a set of virtual serving UE beams (e.g., a set of best UE beams) on a per beam level, per antenna panel, per network node beam (e.g., per SSB), per cell basis. In this way, the virtual serving UE beams may be tracked frequently to avoid staleness when evaluating beam metrics to determine which beam level and/or which antenna panel to use for downlink and/or uplink traffic.

For example, as shown by reference number 610, the UE 120 may receive and measure a set of SSBs transmitted from the network node 110, where each SSB may be transmitted one or more times via a respective beam. Accordingly, the UE 120 may measure each SSB on a per beam level and per antenna panel basis, and may identify a set of virtual serving UE beams that have best current values for a beam metric (e.g., an RSRP parameter or a Pmax parameter, among other examples). In particular, as described herein, the set of virtual serving UE beams may include, for each beam used by the network node 110 to transmit an SSB, a best UE beam at each beam level on each antenna panel equipped at the UE 120. For example, in FIG. 6, reference number 620 depicts a set of virtual serving UE beams for one SSB, shown as $SSB_n$. As shown, the UE 120 may measure the SSB at each of a plurality of beam levels on each of a plurality of panels, and may store information that indicates the best UE beam (e.g., the virtual serving UE beam) per beam level and per panel for each SSB. For example, in FIG. 6, the UE 120 may be equipped with two antenna panels (shown as Panel A and Panel B), and may support three beam levels (e.g., Level 1 (L1) corresponding to a widest beam with a smallest beamforming gain, Level 2 (L2) corresponding to a narrower beam with a higher beamforming gain, and Level 3 (L3)

corresponding to a narrowest beam with a highest beamforming gain). Accordingly, the UE 120 may identify the best beam on each antenna panel at each beam level for each SSB (e.g., shown as shaded beams), which may form the set of virtual serving UE beams associated with each respective SSB. For example, in FIG. 6, the virtual serving UE beam per beam level and per antenna panel for $SSB_n$ is enclosed within a box, and the UE 120 may store similar information for each beam that the network node 110 uses to transmit an SSB.

Accordingly, as shown by reference number 630, the UE 120 may periodically monitor the beam metric associated with each virtual serving UE beam (e.g., every 80 milliseconds or at other suitable intervals) to guarantee that the beam metrics associated with the virtual serving UE beams do not become stale. Furthermore, as shown by reference number 640, the UE 120 may update (e.g., change) a current virtual serving UE beam associated with a particular SSB, beam level, and antenna panel in cases where another UE beam has a beam metric that is better than the current virtual serving UE beam by a value that satisfies (e.g., equals or exceeds) a power hysteresis threshold. For example, in cases where the UE 120 determines that a UE beam associated with a particular SSB, beam level, and antenna panel has a beam metric that is better than the current virtual serving UE beam associated with the same SSB, beam level, and antenna panel by a value that satisfies the power hysteresis threshold, the UE 120 may remeasure the UE beam associated with the better beam metric and change the virtual serving UE beam to the new UE beam only if the beam metric is still better than the current virtual serving UE beam after the remeasurement. For example, referring to reference number 620 in FIG. 6, the UE 120 may periodically monitor the beam metrics associated with $SSB_n$ for virtual serving UE beams 2, 10, and 22 on panel A and the beam metrics associated with $SSB_n$ for virtual serving UE beams 3, 13, and 21 on panel B. In a scenario where the UE 120 determines that the beam metric associated with beam 0 (e.g., at beam level L1 on panel A) is better than the current beam metric associated with beam 2 (e.g., the current virtual serving UE beam at beam level L1 on panel A), the UE 120 may remeasure beam 0 and change the virtual serving UE beam at beam level L1 on panel A to beam 0 if the beam metric for beam 0 is still better than the beam metric for beam 2. Otherwise, if the beam metric for beam 0 is not better than the beam metric for beam 2 when beam 0 is remeasured (e.g., due to high mobility or other factors resulting in fast changes to channel conditions), beam 2 may be maintained as the current virtual serving UE beam for $SSB_n$ at beam level L1 on panel A. In this way, the UE 120 may periodically monitor and update the virtual serving UE beam per SSB, per beam level, and per antenna panel, which may guarantee that the best beam on each beam level at each antenna panel is up-to-date when evaluated in a beam selection or beam management procedure (e.g., using the throughput-constrained beam selection techniques described in further detail elsewhere herein).

As indicated above, FIG. 6 is provided as an example. Other examples may differ from what is described with regard to FIG. 6.

Figure 7:
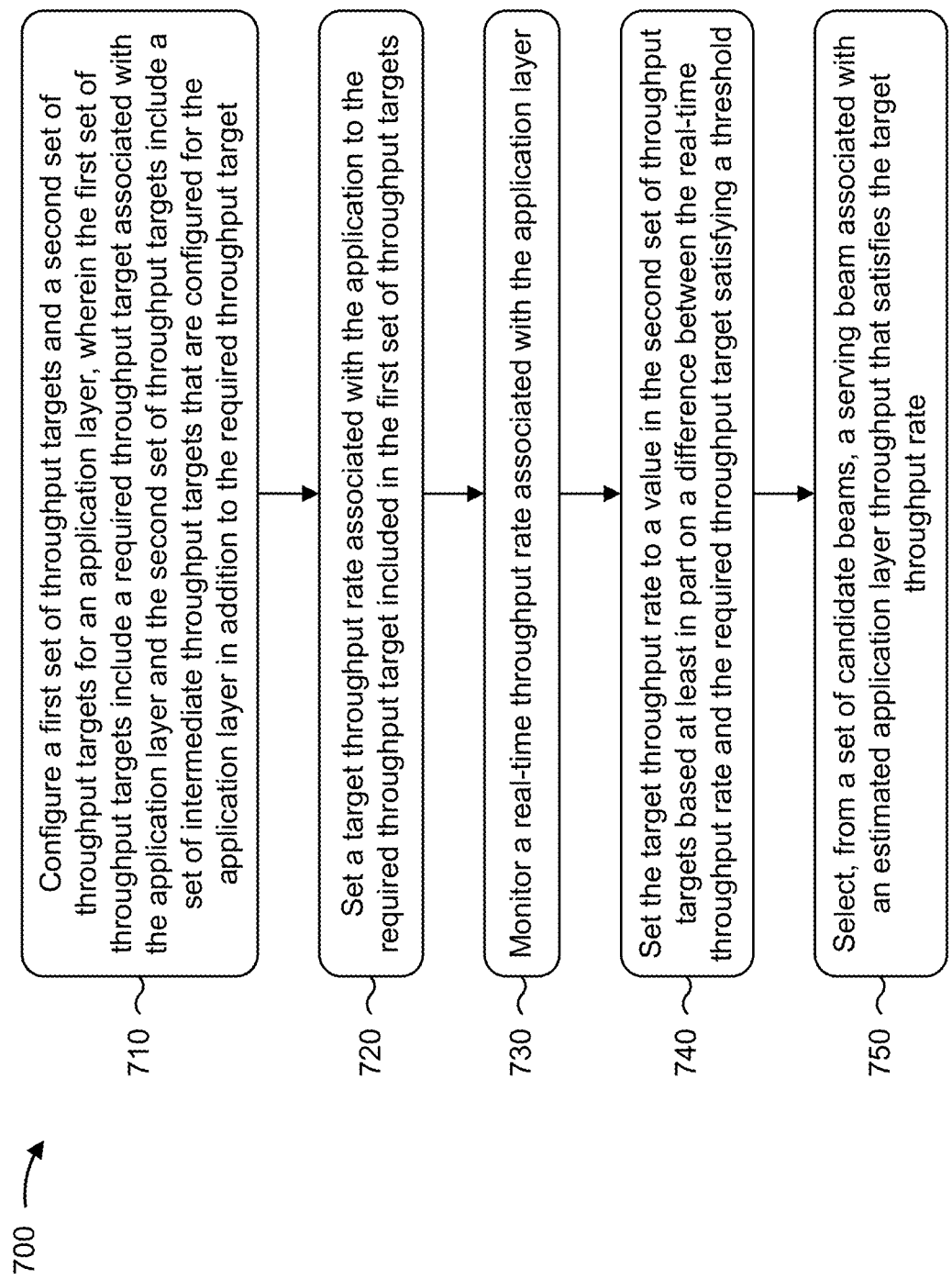
FIGS. 7-8 are diagrams illustrating example processes associated with throughput-constrained beam selection with self-correction and virtual serving beam tracking, in accordance with the present disclosure.

FIG. 7 is a diagram illustrating an example process 700 performed, for example, by a UE, in accordance with the present disclosure. Example process 700 is an example where the UE (e.g., UE 120) performs operations associated with techniques for throughput-constrained beam (TCB) selection with self-correction.

As shown in FIG. 7, in some aspects, process 700 may include configuring a first set of throughput targets and a second set of throughput targets for an application layer, wherein the first set of throughput targets include a required throughput target associated with the application layer and the second set of throughput targets include a set of intermediate throughput targets that are configured for the application layer in addition to the required throughput target (block 710). For example, the UE (e.g., using communication manager 140 and/or TCB selection component 908, depicted in FIG. 9) may configure a first set of throughput targets and a second set of throughput targets for an application layer, wherein the first set of throughput targets include a required throughput target associated with the application layer and the second set of throughput targets include a set of intermediate throughput targets that are configured for the application layer in addition to the required throughput target, as described above.

As further shown in FIG. 7, in some aspects, process 700 may include setting a target throughput rate associated with the application to the required throughput target included in the first set of throughput targets (block 720). For example, the UE (e.g., using communication manager 140 and/or TCB selection component 908, depicted in FIG. 9) may set a target throughput rate associated with the application to the required throughput target included in the first set of throughput targets, as described above.

As further shown in FIG. 7, in some aspects, process 700 may include monitoring a real-time throughput rate associated with the application layer (block 730). For example, the UE (e.g., using communication manager 140 and/or TCB selection component 908, depicted in FIG. 9) may monitor a real-time throughput rate associated with the application layer, as described above.

As further shown in FIG. 7, in some aspects, process 700 may include setting the target throughput rate to a value in the second set of throughput targets based at least in part on a difference between the real-time throughput rate and the required throughput target satisfying a threshold (block 740). For example, the UE (e.g., using communication manager 140 and/or TCB selection component 908, depicted in FIG. 9) may set the target throughput rate to a value in the second set of throughput targets based at least in part on a difference between the real-time throughput rate and the required throughput target satisfying a threshold, as described above.

As further shown in FIG. 7, in some aspects, process 700 may include selecting, from a set of candidate beams, a serving beam associated with an estimated application layer throughput that satisfies the target throughput rate (block 750). For example, the UE (e.g., using communication manager 140 and/or TCB selection component 908, depicted in FIG. 9) may select, from a set of candidate beams, a serving beam associated with an estimated application layer throughput that satisfies the target throughput rate, as described above.

Process 700 may include additional aspects, such as any single aspect or any combination of aspects described below and/or in connection with one or more other processes described elsewhere herein.

In a first aspect, the target throughput rate is set to the value in the second set of throughput targets based at least in part on a number of evaluations of the real-time throughput rate since a last change to the serving beam satisfying a hysteresis parameter.

In a second aspect, alone or in combination with the first aspect, the target throughput rate is set to a higher value than the required throughput target based at least in part on the required throughput target exceeding the real-time throughput rate by a value that satisfies the threshold.

In a third aspect, alone or in combination with one or more of the first and second aspects, the target throughput rate is set to higher values in the second set of throughput targets and the serving beam is reselected until the real-time throughput rate exceeds the required throughput target.

In a fourth aspect, alone or in combination with one or more of the first through third aspects, the target throughput rate is set to a lower value than the required throughput target based at least in part on the real-time throughput rate exceeding the required throughput target by a value that satisfies the threshold.

In a fifth aspect, alone or in combination with one or more of the first through fourth aspects, the target throughput rate is set to lower values in the second set of throughput targets and the serving beam is reselected until the real-time throughput rate is lower than the required throughput target.

In a sixth aspect, alone or in combination with one or more of the first through fifth aspects, the target throughput rate is increased by one increment and the serving beam is reselected after the real-time throughput rate becomes lower than the required throughput target.

In a seventh aspect, alone or in combination with one or more of the first through sixth aspects, the required throughput target is configured by an original equipment manufacturer associated with the UE or based at least in part or an estimation of the required throughput target by the UE.

In an eighth aspect, alone or in combination with one or more of the first through seventh aspects, the required throughput target is associated with a bin for one or more applications running in the application layer.

In a ninth aspect, alone or in combination with one or more of the first through eighth aspects, each beam in the set of candidate beams is associated with a respective estimated application layer throughput based at least in part on a physical layer metric associated with the respective beam.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
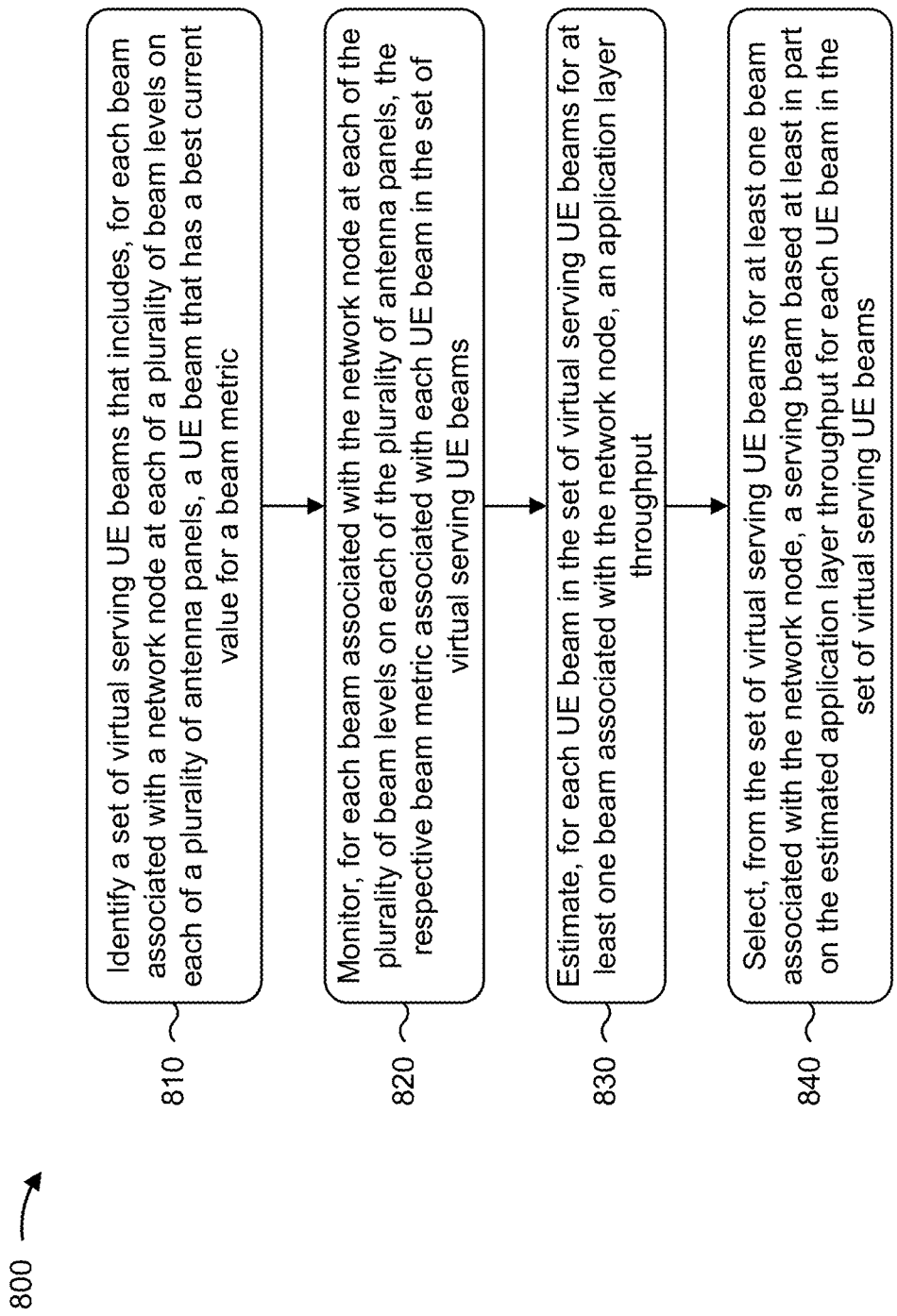

FIG. 8 is a diagram illustrating an example process 800 performed, for example, by a UE, in accordance with the present disclosure. Example process 800 is an example where the UE (e.g., UE 120) performs operations associated with techniques for TCB selection with virtual serving beam tracking.

As shown in FIG. 8, in some aspects, process 800 may include identifying a set of virtual serving UE beams that includes, for each beam associated with a network node at each of a plurality of beam levels on each of a plurality of antenna panels, a UE beam that has a best current value for a beam metric (block 810). For example, the UE (e.g., using communication manager 140 and/or TCB tracking component 910, depicted in FIG. 9) may identify a set of virtual serving UE beams that includes, for each beam associated with a network node at each of a plurality of beam levels on each of a plurality of antenna panels, a UE beam that has a best current value for a beam metric, as described above.

As further shown in FIG. 8, in some aspects, process 800 may include monitoring, for each beam associated with the network node at each of the plurality of beam levels on each of the plurality of antenna panels, the respective beam metric associated with each UE beam in the set of virtual serving UE beams (block 820). For example, the UE (e.g., using communication manager 140 and/or TCB tracking component 910, depicted in FIG. 9) may monitor, for each beam associated with the network node at each of the plurality of beam levels on each of the plurality of antenna panels, the respective beam metric associated with each UE beam in the set of virtual serving UE beams, as described above.

As further shown in FIG. 8, in some aspects, process 800 may include estimating, for each UE beam in the set of virtual serving UE beams for at least one beam associated with the network node, an application layer throughput (block 830). For example, the UE (e.g., using communication manager 140 and/or TCB tracking component 910, depicted in FIG. 9) may estimate, for each UE beam in the set of virtual serving UE beams for at least one beam associated with the network node, an application layer throughput, as described above.

As further shown in FIG. 8, in some aspects, process 800 may include selecting, from the set of virtual serving UE beams for at least one beam associated with the network node, a serving beam based at least in part on the estimated application layer throughput for each UE beam in the set of virtual serving UE beams (block 840). For example, the UE (e.g., using communication manager 140 and/or TCB tracking component 910, depicted in FIG. 9) may select, from the set of virtual serving UE beams for at least one beam associated with the network node, a serving beam based at least in part on the estimated application layer throughput for each UE beam in the set of virtual serving UE beams, as described above.

Process 800 may include additional aspects, such as any single aspect or any combination of aspects described below and/or in connection with one or more other processes described elsewhere herein.

In a first aspect, the monitoring includes measuring, for each beam associated with the network node at each of the plurality of beam levels on each of the plurality of antenna panels, the respective beam metric associated with each UE beam in the set of virtual serving UE beams at periodic intervals.

In a second aspect, alone or in combination with the first aspect, process 800 includes updating the set of virtual serving UE beams for a beam associated with the network node based at least in part on a current value for the beam metric satisfying one or more conditions for a new UE beam that differs from a current UE beam included in the set of virtual serving UE beams for the beam associated with the network node.

In a third aspect, alone or in combination with one or more of the first and second aspects, the one or more conditions are satisfied based at least in part on the current value for the beam metric for the new UE beam exceeding the current value for the beam metric for the current UE beam included in the set of virtual serving UE beams by a value that satisfies a power hysteresis threshold.

In a fourth aspect, alone or in combination with one or more of the first through third aspects, the one or more conditions are satisfied based at least in part on a subsequent value for the beam metric for the new UE beam exceeding the current value for the beam metric for the current UE beam included in the set of virtual serving UE beams by a value that satisfies the power hysteresis threshold.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
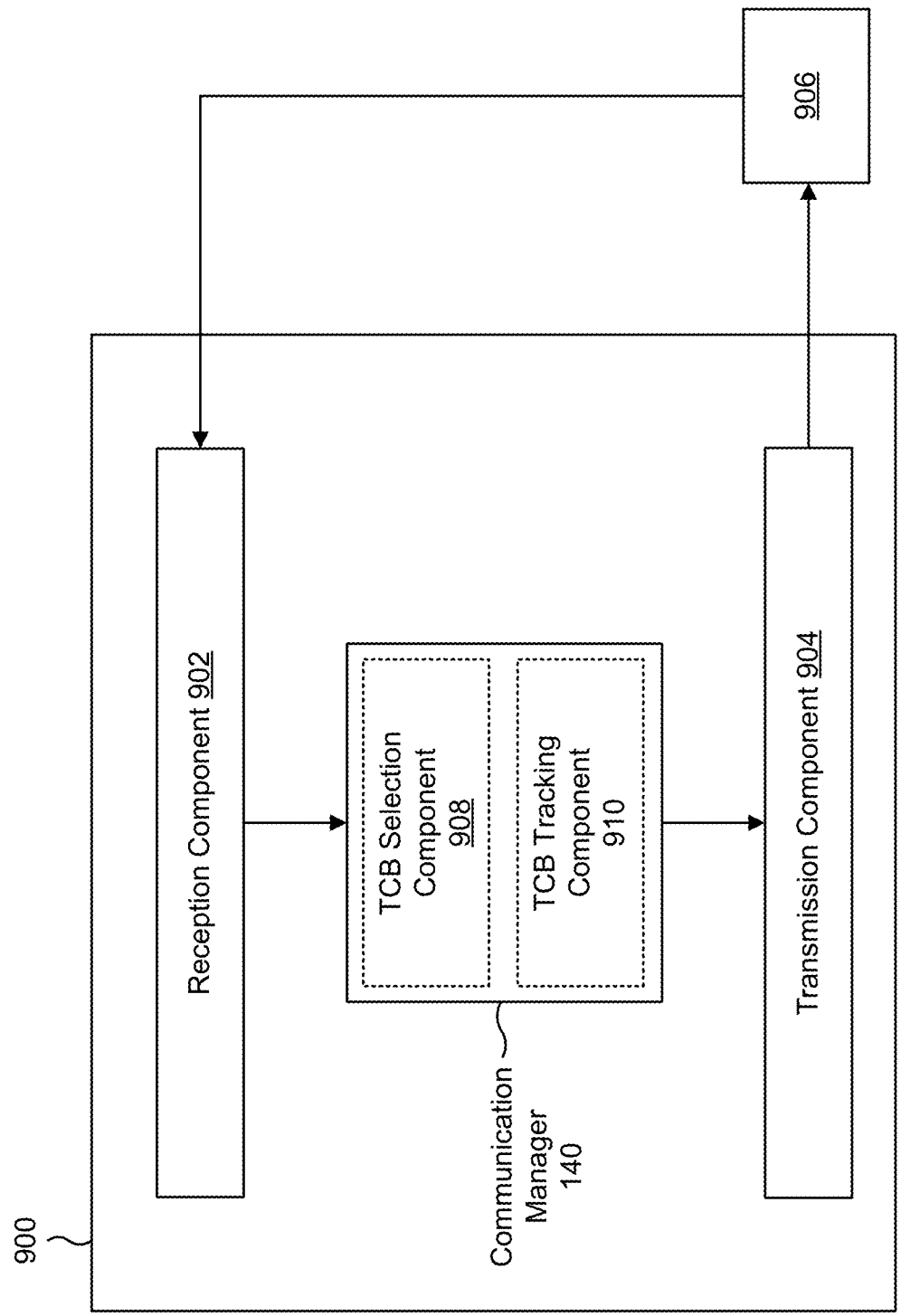
FIG. 9 is a diagram of an example apparatus for wireless communication, in accordance with the present disclosure.

FIG. 9 is a diagram of an example apparatus 900 for wireless communication, in accordance with the present disclosure. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 140. The communication manager 140 may include one or more of a TCB selection component 908 or a TCB tracking component 910, among other examples.

In some aspects, the apparatus 900 may be configured to perform one or more operations described herein in connection with FIGS. 4A-4B, FIG. 5, and/or FIG. 6. Additionally, or alternatively, the apparatus 900 may be configured to perform one or more processes described herein, such as process 700 of FIG. 7, process 800 of FIG. 8, or a combination thereof. In some aspects, the apparatus 900 and/or one or more components shown in FIG. 9 may include one or more components of the UE described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the UE described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the UE described in connection with FIG. 2. In some aspects, the transmission component 904 may be co-located with the reception component 902 in a transceiver.

The TCB selection component 908 may configure a first set of throughput targets and a second set of throughput targets for an application layer, wherein the first set of throughput targets include a required throughput target associated with the application layer and the second set of throughput targets include a set of intermediate throughput targets that are configured for the application layer in addition to the required throughput target. The TCB selection component 908 may set a target throughput rate associated with the application to the required throughput target included in the first set of throughput targets. The TCB selection component 908 may monitor a real-time throughput rate associated with the application layer. The TCB selection component 908 may set the target throughput rate to a value in the second set of throughput targets based at least in part on a difference between the real-time throughput rate and the required throughput target satisfying a threshold. The TCB selection component 908 may select, from a set of candidate beams, a serving beam associated with an estimated application layer throughput that satisfies the target throughput rate.

The TCB tracking component 910 may identify a set of virtual serving UE beams that includes, for each beam associated with a network node at each of a plurality of beam levels on each of a plurality of antenna panels, a UE beam that has a best current value for a beam metric. The TCB tracking component 910 may monitor, for each beam associated with the network node at each of the plurality of beam levels on each of the plurality of antenna panels, the respective beam metric associated with each UE beam in the set of virtual serving UE beams. The TCB tracking component 910 may estimate, for each UE beam in the set of virtual serving UE beams for at least one beam associated with the network node, an application layer throughput. The TCB tracking component 910 may select, from the set of virtual serving UE beams for at least one beam associated with the network node, a serving beam based at least in part on the estimated application layer throughput for each UE beam in the set of virtual serving UE beams.

The TCB tracking component 910 may update the set of virtual serving UE beams for a beam associated with the network node based at least in part on a current value for the beam metric satisfying one or more conditions for a new UE beam that differs from a current UE beam included in the set of virtual serving UE beams for the beam associated with the network node.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a UE, comprising: configuring a first set of throughput targets and a second set of throughput targets for an application layer, wherein the first set of throughput targets include a required throughput target associated with the application layer and the second set of throughput targets include a set of intermediate throughput targets that are configured for the application layer in addition to the required throughput target; setting a target throughput rate associated with the application to the required throughput target included in the first set of throughput targets; monitoring a real-time throughput rate associated with the application layer; setting the target throughput rate to a value in the second set of throughput targets based at least in part on a difference between the real-time throughput rate and the required throughput target satisfying a threshold; and selecting, from a set of candidate beams, a serving beam associated with an estimated application layer throughput that satisfies the target throughput rate.

Aspect 2: The method of Aspect 1, wherein the target throughput rate is set to the value in the second set of throughput targets based at least in part on a number of evaluations of the real-time throughput rate since a last change to the serving beam satisfying a hysteresis parameter.

Aspect 3: The method of any of Aspects 1-2, wherein the target throughput rate is set to a higher value than the required throughput target based at least in part on the required throughput target exceeding the real-time throughput rate by a value that satisfies the threshold.

Aspect 4: The method of Aspect 3, wherein the target throughput rate is set to higher values in the second set of throughput targets and the serving beam is reselected until the real-time throughput rate exceeds the required throughput target.

Aspect 5: The method of any of Aspects 1-2, wherein the target throughput rate is set to a lower value than the required throughput target based at least in part on the real-time throughput rate exceeding the required throughput target by a value that satisfies the threshold.

Aspect 6: The method of Aspect 5, wherein the target throughput rate is set to lower values in the second set of throughput targets and the serving beam is reselected until the real-time throughput rate is lower than the required throughput target.

Aspect 7: The method of Aspect 6, wherein the target throughput rate is increased by one increment and the serving beam is reselected after the real-time throughput rate becomes lower than the required throughput target.

Aspect 8: The method of any of Aspects 1-7, wherein the required throughput target is configured by an original equipment manufacturer associated with the UE or based at least in part or an estimation of the required throughput target by the UE.

Aspect 9: The method of any of Aspects 1-8, wherein the required throughput target is associated with a bin for one or more applications running in the application layer.

Aspect 10: The method of any of Aspects 1-9, wherein each beam in the set of candidate beams is associated with a respective estimated application layer throughput based at least in part on a physical layer metric associated with the respective beam.

Aspect 11: A method of wireless communication performed by a UE, comprising: identifying a set of virtual serving UE beams that includes, for each beam associated with a network node at each of a plurality of beam levels on each of a plurality of antenna panels, a UE beam that has a best current value for a beam metric; monitoring, for each beam associated with the network node at each of the plurality of beam levels on each of the plurality of antenna panels, the respective beam metric associated with each UE beam in the set of virtual serving UE beams; estimating, for each UE beam in the set of virtual serving UE beams for at least one beam associated with the network node, an application layer throughput; and selecting, from the set of virtual serving UE beams for at least one beam associated with the network node, a serving beam based at least in part on the estimated application layer throughput for each UE beam in the set of virtual serving UE beams.

Aspect 12: The method of Aspect 11, wherein the monitoring includes measuring, for each beam associated with the network node at each of the plurality of beam levels on each of the plurality of antenna panels, the respective beam metric associated with each UE beam in the set of virtual serving UE beams at periodic intervals.

Aspect 13: The method of any of Aspects 11-12, further comprising: updating the set of virtual serving UE beams for a beam associated with the network node based at least in part on a current value for the beam metric satisfying one or more conditions for a new UE beam that differs from a current UE beam included in the set of virtual serving UE beams for the beam associated with the network node.

Aspect 14: The method of Aspect 13, wherein the one or more conditions are satisfied based at least in part on the current value for the beam metric for the new UE beam exceeding the current value for the beam metric for the current UE beam included in the set of virtual serving UE beams by a value that satisfies a power hysteresis threshold.

Aspect 15: The method of Aspect 14, wherein the one or more conditions are satisfied based at least in part on a subsequent value for the beam metric for the new UE beam exceeding the current value for the beam metric for the current UE beam included in the set of virtual serving UE beams by a value that satisfies the power hysteresis threshold.

Aspect 16: An apparatus for wireless communication at a device, comprising a processor; memory coupled with the processor; and instructions stored in the memory and executable by the processor to cause the apparatus to perform the method of one or more of Aspects 1-10.

Aspect 17: A device for wireless communication, comprising a memory and one or more processors coupled to the memory, the one or more processors configured to perform the method of one or more of Aspects 1-10.

Aspect 18: An apparatus for wireless communication, comprising at least one means for performing the method of one or more of Aspects 1-10.

Aspect 19: A non-transitory computer-readable medium storing code for wireless communication, the code comprising instructions executable by a processor to perform the method of one or more of Aspects 1-10.

Aspect 20: A non-transitory computer-readable medium storing a set of instructions for wireless communication, the set of instructions comprising one or more instructions that, when executed by one or more processors of a device, cause the device to perform the method of one or more of Aspects 1-10.

Aspect 21: An apparatus for wireless communication at a device, comprising a processor; memory coupled with the processor; and instructions stored in the memory and executable by the processor to cause the apparatus to perform the method of one or more of Aspects 11-15.

Aspect 22: A device for wireless communication, comprising a memory and one or more processors coupled to the memory, the one or more processors configured to perform the method of one or more of Aspects 11-15.

Aspect 23: An apparatus for wireless communication, comprising at least one means for performing the method of one or more of Aspects 11-15.

Aspect 24: A non-transitory computer-readable medium storing code for wireless communication, the code comprising instructions executable by a processor to perform the method of one or more of Aspects 11-15.

Aspect 25: A non-transitory computer-readable medium storing a set of instructions for wireless communication, the set of instructions comprising one or more instructions that, when executed by one or more processors of a device, cause the device to perform the method of one or more of Aspects 11-15.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software. As used herein, the phrase "based on" is intended to be broadly construed to mean "based at least in part on." As used herein, "satisfying a threshold" may, depending on the context, refer to a value being greater than the threshold, greater than or equal to the threshold, less than the threshold, less than or equal to the threshold, equal to the threshold, or not equal to the threshold, among other examples. As used herein, a phrase referring to "at least one of" a list of items refers to any combination of those items, including single members. As an example, "at least one of: a, b, or c" is intended to cover: a, b, c, a+b, a+c, b+c, and a+b+c.

Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (for example, related items, unrelated items, or a combination of related and unrelated items), and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A also may have B). Further, as used herein, the term "or" is intended to be inclusive when used in a series and may be used interchangeably with "and/or," unless explicitly stated otherwise (for example, if used in combination with "either" or "only one of").

The various illustrative logics, logical blocks, modules, circuits and algorithm processes described in connection with the aspects disclosed herein may be implemented as electronic hardware, computer software, or combinations of both. The interchangeability of hardware and software has been described generally, in terms of functionality, and illustrated in the various illustrative components, blocks, modules, circuits and processes described herein. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices, for example, a combination of a DSP and a microprocessor, a plurality of microprocessors, one or more microprocessors in conjunction with a DSP core, or any other such configuration. In some aspects, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Aspects of the subject matter described in this specification also can be implemented as one or more computer programs (such as one or more modules of computer program instructions) encoded on a computer storage media for execution by, or to control the operation of, a data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the media described herein should also be included within the scope of computer-readable media. Additionally, the operations of a method or algorithm may reside as one or any combination or set of codes and instructions on a machine readable medium and computer-readable medium, which may be incorporated into a computer program product.

Various modifications to the aspects described in this disclosure may be readily apparent to those skilled in the art, and the generic principles defined herein may be applied to other aspects without departing from the spirit or scope of this disclosure. Thus, the claims are not intended to be limited to the aspects shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate aspects also can be implemented in combination in a single aspect. Conversely, various features that are described in the context of a single aspect also can be implemented in multiple aspects separately or in any suitable subcombination. Moreover, although features may be described as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the aspects described should not be understood as requiring such separation in all aspects, and it should be understood that the described program components and systems can generally be integrated together in a single software product or packaged into multiple software products. Additionally, other aspects are within the scope of the following claims. In some cases, the actions recited in the claims can be performed in a different order and still achieve desirable results.

What is claimed is:

1. A method of wireless communication performed by a user equipment (UE), comprising:
   configuring a first set of throughput targets and a second set of throughput targets for an application layer, wherein the first set of throughput targets include a required throughput target associated with the application layer and the second set of throughput targets include a set of intermediate throughput targets that are configured for the application layer in addition to the required throughput target;
   setting a target throughput rate associated with the application to the required throughput target included in the first set of throughput targets;
   monitoring a real-time throughput rate associated with the application layer;
   setting the target throughput rate to a value in the second set of throughput targets based at least in part on a difference between the real-time throughput rate and the required throughput target satisfying a threshold; and
   selecting, from a set of candidate beams, a serving beam associated with an estimated application layer throughput that satisfies the target throughput rate.

2. The method of claim 1, wherein the target throughput rate is set to the value in the second set of throughput targets based at least in part on a number of evaluations of the real-time throughput rate since a last change to the serving beam satisfying a hysteresis parameter.

3. The method of claim 1, wherein the target throughput rate is set to a higher value than the required throughput target based at least in part on the required throughput target exceeding the real-time throughput rate by a value that satisfies the threshold.

4. The method of claim 3, wherein the target throughput rate is set to higher values in the second set of throughput targets and the serving beam is reselected until the real-time throughput rate exceeds the required throughput target.

5. The method of claim 1, wherein the target throughput rate is set to a lower value than the required throughput target based at least in part on the real-time throughput rate exceeding the required throughput target by a value that satisfies the threshold.

6. The method of claim 5, wherein the target throughput rate is set to lower values in the second set of throughput targets and the serving beam is reselected until the real-time throughput rate is lower than the required throughput target.

7. The method of claim 6, wherein the target throughput rate is increased by one increment and the serving beam is reselected after the real-time throughput rate becomes lower than the required throughput target.

8. The method of claim 1, wherein the required throughput target is configured by an original equipment manufacturer associated with the UE or based at least in part or an estimation of the required throughput target by the UE.

9. The method of claim 1, wherein the required throughput target is associated with a bin for one or more applications running in the application layer.

10. The method of claim 1, wherein each beam in the set of candidate beams is associated with a respective estimated application layer throughput based at least in part on a physical layer metric associated with the respective beam.

11. A method of wireless communication performed by a user equipment (UE), comprising:
   identifying a set of virtual serving UE beams that includes, for each beam associated with a network node at each of a plurality of beam levels on each of a plurality of antenna panels, a UE beam that has a best current value for a beam metric;
   monitoring, for each beam associated with the network node at each of the plurality of beam levels on each of the plurality of antenna panels, the respective beam metric associated with each UE beam in the set of virtual serving UE beams;
   estimating, for each UE beam in the set of virtual serving UE beams for at least one beam associated with the network node, an application layer throughput; and
   selecting, from the set of virtual serving UE beams for at least one beam associated with the network node, a serving beam based at least in part on the estimated application layer throughput for each UE beam in the set of virtual serving UE beams.

12. The method of claim 11, wherein the monitoring includes measuring, for each beam associated with the network node at each of the plurality of beam levels on each of the plurality of antenna panels, the respective beam metric associated with each UE beam in the set of virtual serving UE beams at periodic intervals.

13. The method of claim 11, further comprising:
   updating the set of virtual serving UE beams for a beam associated with the network node based at least in part on a current value for the beam metric satisfying one or more conditions for a new UE beam that differs from a current UE beam included in the set of virtual serving UE beams for the beam associated with the network node.

14. The method of claim 13, wherein the one or more conditions are satisfied based at least in part on the current value for the beam metric for the new UE beam exceeding the current value for the beam metric for the current UE beam included in the set of virtual serving UE beams by a value that satisfies a power hysteresis threshold.

15. The method of claim 14, wherein the one or more conditions are satisfied based at least in part on a subsequent value for the beam metric for the new UE beam exceeding the current value for the beam metric for the current UE beam included in the set of virtual serving UE beams by a value that satisfies the power hysteresis threshold.

16. A user equipment (UE) for wireless communication, comprising:
a memory; and
one or more processors, coupled to the memory, configured to:
configure a first set of throughput targets and a second set of throughput targets for an application layer, wherein the first set of throughput targets include a required throughput target associated with the application layer and the second set of throughput targets include a set of intermediate throughput targets that are configured for the application layer in addition to the required throughput target;
set a target throughput rate associated with the application to the required throughput target included in the first set of throughput targets;
monitor a real-time throughput rate associated with the application layer;
set the target throughput rate to a value in the second set of throughput targets based at least in part on a difference between the real-time throughput rate and the required throughput target satisfying a threshold; and
select, from a set of candidate beams, a serving beam associated with an estimated application layer throughput that satisfies the target throughput rate.

17. The UE of claim 16, wherein the target throughput rate is set to the value in the second set of throughput targets based at least in part on a number of evaluations of the real-time throughput rate since a last change to the serving beam satisfying a hysteresis parameter.

18. The UE of claim 16, wherein the target throughput rate is set to a higher value than the required throughput target based at least in part on the required throughput target exceeding the real-time throughput rate by a value that satisfies the threshold.

19. The UE of claim 18, wherein the target throughput rate is set to higher values in the second set of throughput targets and the serving beam is reselected until the real-time throughput rate exceeds the required throughput target.

20. The UE of claim 16, wherein the target throughput rate is set to a lower value than the required throughput target based at least in part on the real-time throughput rate exceeding the required throughput target by a value that satisfies the threshold.

21. The UE of claim 20, wherein the target throughput rate is set to lower values in the second set of throughput targets and the serving beam is reselected until the real-time throughput rate is lower than the required throughput target.

22. The UE of claim 21, wherein the target throughput rate is increased by one increment and the serving beam is reselected after the real-time throughput rate becomes lower than the required throughput target.

23. The UE of claim 16, wherein the required throughput target is configured by an original equipment manufacturer associated with the UE or based at least in part or an estimation of the required throughput target by the UE.

24. The UE of claim 16, wherein the required throughput target is associated with a bin for one or more applications running in the application layer.

25. The UE of claim 16, wherein each beam in the set of candidate beams is associated with a respective estimated application layer throughput based at least in part on a physical layer metric associated with the respective beam.

26. A UE for wireless communication, comprising:
a memory; and
one or more processors, coupled to the memory, configured to:
identify a set of virtual serving UE beams that includes, for each beam associated with a network node at each of a plurality of beam levels on each of a plurality of antenna panels, a UE beam that has a best current value for a beam metric;
monitor, for each beam associated with the network node at each of the plurality of beam levels on each of the plurality of antenna panels, the respective beam metric associated with each UE beam in the set of virtual serving UE beams;
estimate, for each UE beam in the set of virtual serving UE beams for at least one beam associated with the network node, an application layer throughput; and
select, from the set of virtual serving UE beams for at least one beam associated with the network node, a serving beam based at least in part on the estimated application layer throughput for each UE beam in the set of virtual serving UE beams.

27. The UE of claim 26, wherein the monitoring includes measuring, for each beam associated with the network node at each of the plurality of beam levels on each of the plurality of antenna panels, the respective beam metric associated with each UE beam in the set of virtual serving UE beams at periodic intervals.

28. The UE of claim 26, wherein the one or more processors are further configured to:
update the set of virtual serving UE beams for a beam associated with the network node based at least in part on a current value for the beam metric satisfying one or more conditions for a new UE beam that differs from a current UE beam included in the set of virtual serving UE beams for the beam associated with the network node.

29. The UE of claim 28, wherein the one or more conditions are satisfied based at least in part on the current value for the beam metric for the new UE beam exceeding the current value for the beam metric for the current UE beam included in the set of virtual serving UE beams by a value that satisfies a power hysteresis threshold.

30. The UE of claim 29, wherein the one or more conditions are satisfied based at least in part on a subsequent value for the beam metric for the new UE beam exceeding the current value for the beam metric for the current UE beam included in the set of virtual serving UE beams by a value that satisfies the power hysteresis threshold.

* * * * *